(12) United States Patent
Borigo et al.

(10) Patent No.: US 11,519,878 B2
(45) Date of Patent: Dec. 6, 2022

(54) DRY-COUPLED MAGNETOSTRICTIVE GUIDED WAVE SCANNING SYSTEM AND METHOD

(71) Applicant: FBS, Inc., Bellefonte, PA (US)

(72) Inventors: Cody J. Borigo, Elizabethtown, PA (US); Steven E. Owens, State College, PA (US); Russell Love, State College, PA (US)

(73) Assignee: FBS, Inc., Bellefonte, PA (US)

( * ) Notice: Subject to any disclaimer, the term of this patent is extended or adjusted under 35 U.S.C. 154(b) by 0 days.

(21) Appl. No.: 17/189,631

(22) Filed: Mar. 2, 2021

(65) Prior Publication Data

US 2021/0278370 A1    Sep. 9, 2021

Related U.S. Application Data

(60) Provisional application No. 62/985,054, filed on Mar. 4, 2020.

(51) Int. Cl.
*G01N 27/82* (2006.01)
*G01B 21/22* (2006.01)

(52) U.S. Cl.
CPC ............. *G01N 27/82* (2013.01); *G01B 21/22* (2013.01)

(58) Field of Classification Search
CPC ........ G01N 27/00; G01N 27/82; G01N 29/00; G01N 29/22; G01N 29/24; G01N 29/26; G01N 29/2412; G01N 29/265; G01N 29/069; G01N 29/262; G01N 2291/00; G01N 2291/04; G01N 2291/042; G01N 2291/0425; G01N 2291/0427; B06B 1/08; G01B 21/00; G01B 21/22

See application file for complete search history.

(56) References Cited

U.S. PATENT DOCUMENTS

| 4,356,731 | A | 11/1982 | Mahony |
| 9,915,632 | B2 | 3/2018 | Owens et al. |

(Continued)

OTHER PUBLICATIONS

Rose, J.L., "Ultrasonic Waves in Solid Media," Cambridge University Press, New York, NY, 2004.

(Continued)

*Primary Examiner* — Son T Le
*Assistant Examiner* — Matthew W. Baca
(74) *Attorney, Agent, or Firm* — Duane Morris LLP

(57) ABSTRACT

A system includes a scanner body, a sensor package, a magnet, an actuator mechanism, and a retention mechanism. The sensor package includes a ferromagnetic strip and a flexible coil configured to at least one of transmit and detect a guided wave. The magnet is for applying a biasing magnetic field to the ferromagnetic strip. The actuator mechanism is configured to provide a mechanical pressure coupling between the magnetostrictive strip and a structure, and the retention mechanism is configured to counteract a force applied by the actuator mechanism. A processor is in communication with the sensor package and is configured to record guided wave signals detected by the flexible sensor coil, record scanner body location data provided by a position encoder, and generate two-dimensional image data of an anomaly in the structure based on the guided wave signals and location data. Methods of use and operation also are disclosed.

20 Claims, 37 Drawing Sheets

(56) References Cited

U.S. PATENT DOCUMENTS

| | | | |
|---|---|---|---|
| 10,119,942 B2 | 11/2018 | Owens et al. | |
| 2016/0238564 A1* | 8/2016 | Owens | G01N 29/2412 |
| 2016/0290965 A1* | 10/2016 | Owens | G01N 27/82 |
| 2018/0217105 A1* | 8/2018 | Borigo | G01N 29/069 |

OTHER PUBLICATIONS

Sicard et al., "A SAFT algorithm for lamb wave imaging of isotropic plate-like structure," Ultrasonics 39, 2002, pp. 487-494.
Sicard et al., "Guided Lamb Waves and L-SAFT Processing Techniques for Enhanced Detection and Imaging of Corrosion Defects in Plates with Small Depth-to-Wavelength Ratio," IEEE Transactions on Ultrasonics, Ferroelectrics, and Frequency Control, vol. 51, No. 10, Oct. 2004, pp. 1287-1297.

* cited by examiner

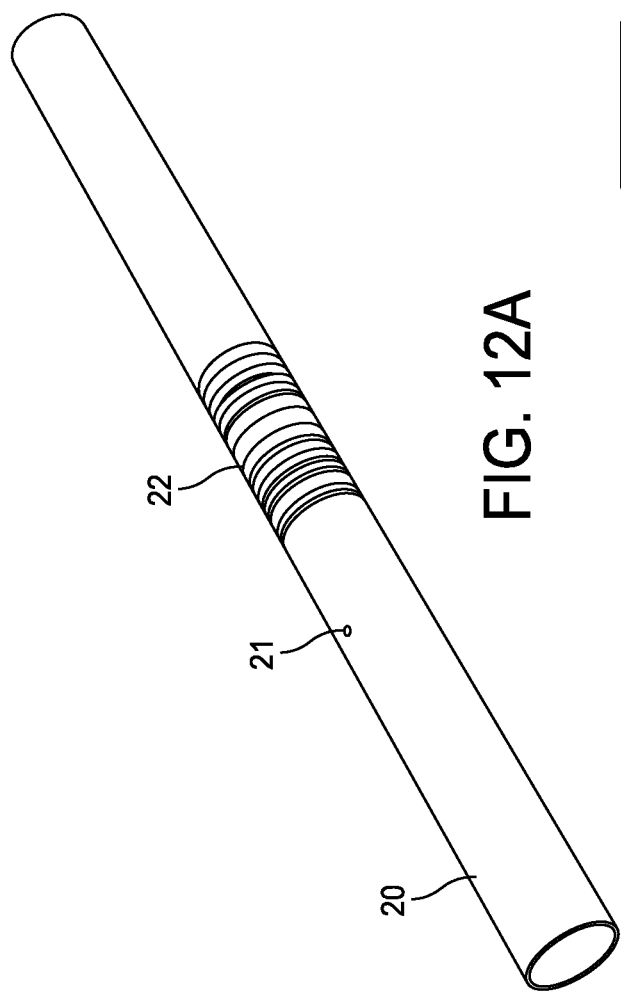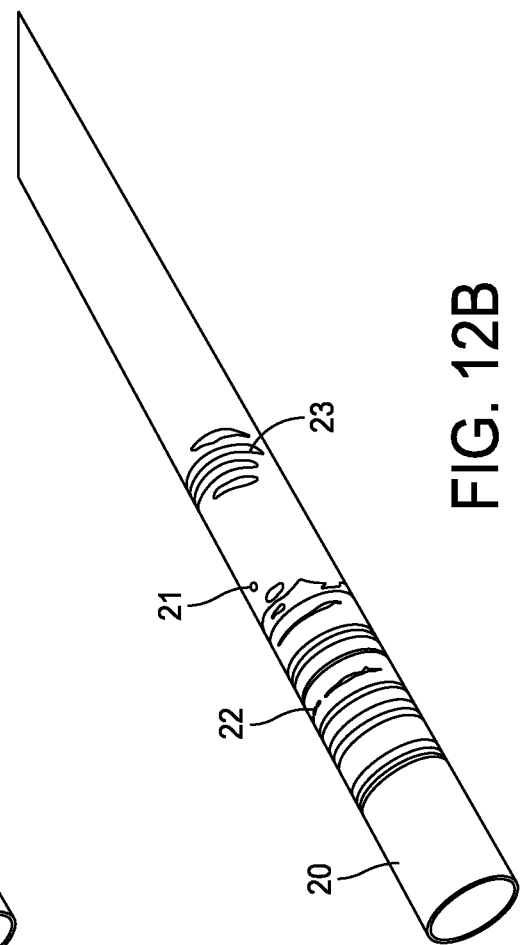

DRY-COUPLED MAGNETOSTRICTIVE GUIDED WAVE SCANNING SYSTEM AND METHOD

CROSS-REFERENCE TO RELATED APPLICATIONS

This application claim priority to U.S. Provisional Patent Application No. 62/985,054, filed Mar. 4, 2020, entitled "DRY-COUPLED MAGNETOSTRICTIVE GUIDED WAVE SCANNING SYSTEM AND METHOD," the entirety of which is incorporated by reference herein.

FIELD

This disclosure relates to the non-destructive inspection of sections of pipes, tubes, cylinders, and cylindrical vessels using ultrasonic guided waves.

BACKGROUND

Ultrasonic guided wave techniques are utilized in a wide range of non-destructive inspection applications including those for pipes, plates, and shells comprised of metals, composites, and other materials. Guided waves are elastic waves propagating in a bounded structure that is utilized as a waveguide to transmit efficiently one or more wave modes along the structure. One of the foremost benefits of guided waves over other non-destructive inspection techniques is the ability of said waves to propagate over long distances, in many cases, hundreds of feet, and to inspect inaccessible or hidden structures from a single probe position.

SUMMARY

A technology for dry-coupling a scanning magnetostrictive sensor including at least one ferromagnetic strip is disclosed. Specifically, the disclosed invention is configured to facilitate coupling a ferromagnetic strip to a pipe, tube, cylinder, cylindrical vessel, or other structure in which said sensor including said strip is configured to be moved around the circumference of said structure such that the motion periodically ceases in order to collect guided wave data. During each cessation of motion, the at least one ferromagnetic strip in the magnetostrictive sensor is temporarily coupled to the structure using mechanical pressure coupling during at least one of guided wave excitation and guided wave detection.

In some embodiments, a magnetostrictive dry-coupling system for pipes, tubes, cylinders, and cylindrical vessels includes at least one ferromagnetic strip, at least one magnetostrictive receiver coil, a driver unit, a dry coupling pressure mechanism, at least one magnet, a position encoder, at least one wheel configured to move said at least one of said driver unit and said receiver coil around said structure, a means for detecting reflected guided wave energy via said receiver coil, and a processor. At least one ferromagnetic strip is configured to be temporarily coupled to said structure by means of mechanical pressure coupling adjacent to the receiver coil. The at least one magnet, which may be a permanent magnet or an electromagnet, is configured to apply a biasing magnetization to the at least one strip. The processor is configured to record guided wave reflections via the receiver coil and process the guided wave and receiver coil position data to generate at least one of a one-dimensional image and a two-dimensional image of anomalies in said structure.

In some embodiments, a method for the non-destructive inspection of pipes, tubes, cylinders, and cylindrical vessels includes applying a biasing magnetic field to at least one ferromagnetic strip, utilizing a driver unit to move a magnetostrictive receiver coil around said structure adjacent to at least one ferromagnetic strip, detecting guided wave reflections using said receiver coil, and recording and processing guided wave and position data to generate at least one of a one-dimensional image and a two-dimensional image of anomalies in said structure.

BRIEF DESCRIPTION FO THE FIGURES

FIGS. 12A and 12B illustrate examples of axisymmetric and flexural guided waves that may be generate and detected by a magnetostrictive LRUT guided-wave inspection system in accordance with some embodiments;

Figure 17A:
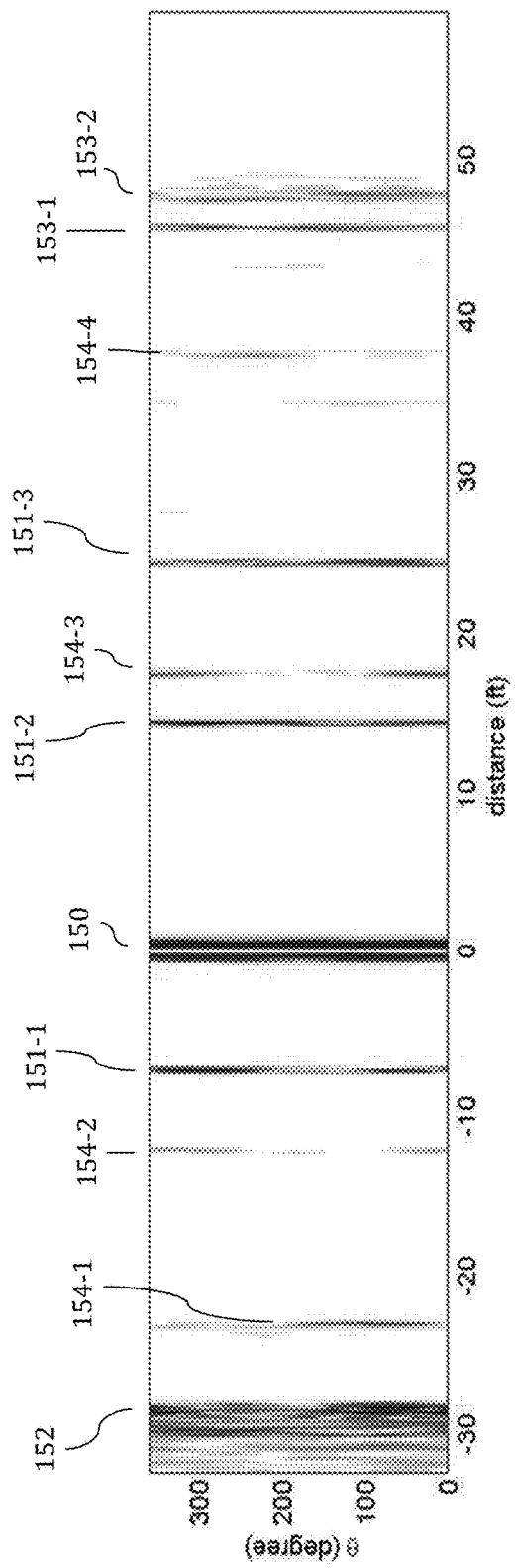
Figure 17B:
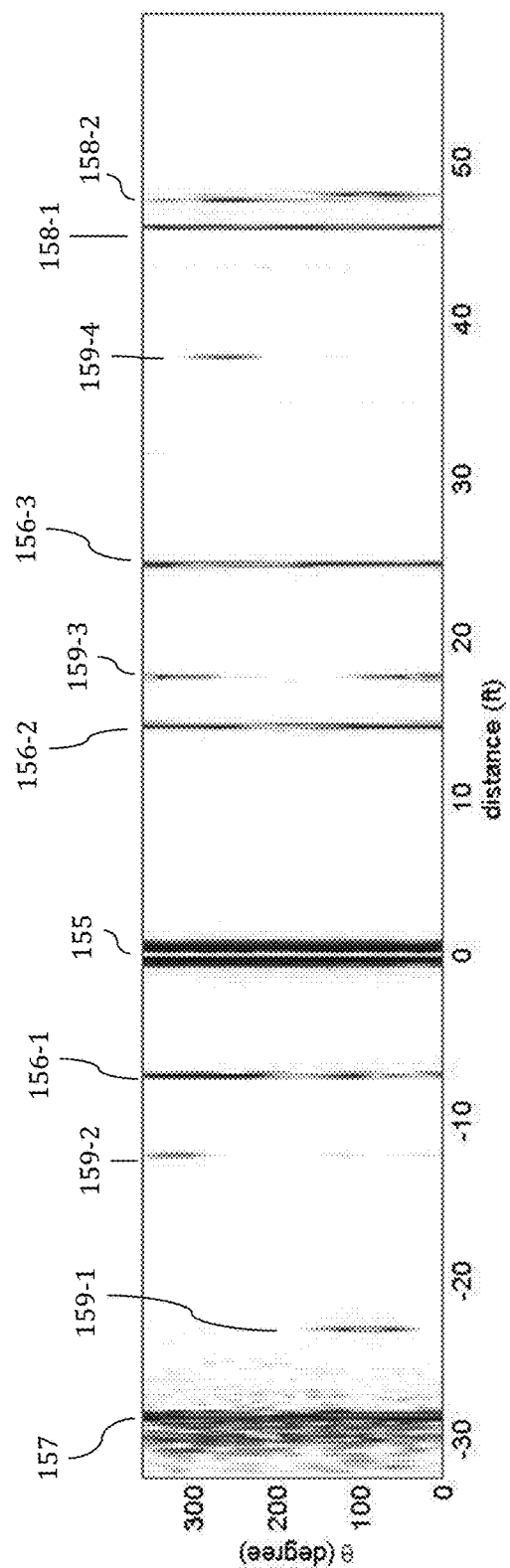
Figure 18:
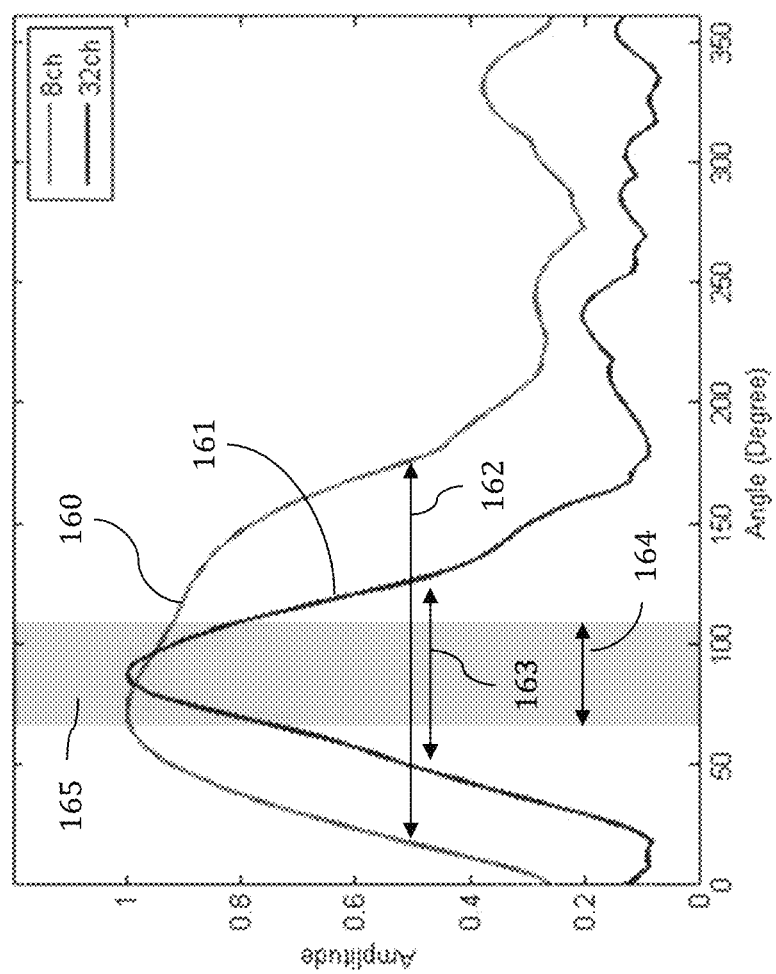
Figure 19A:
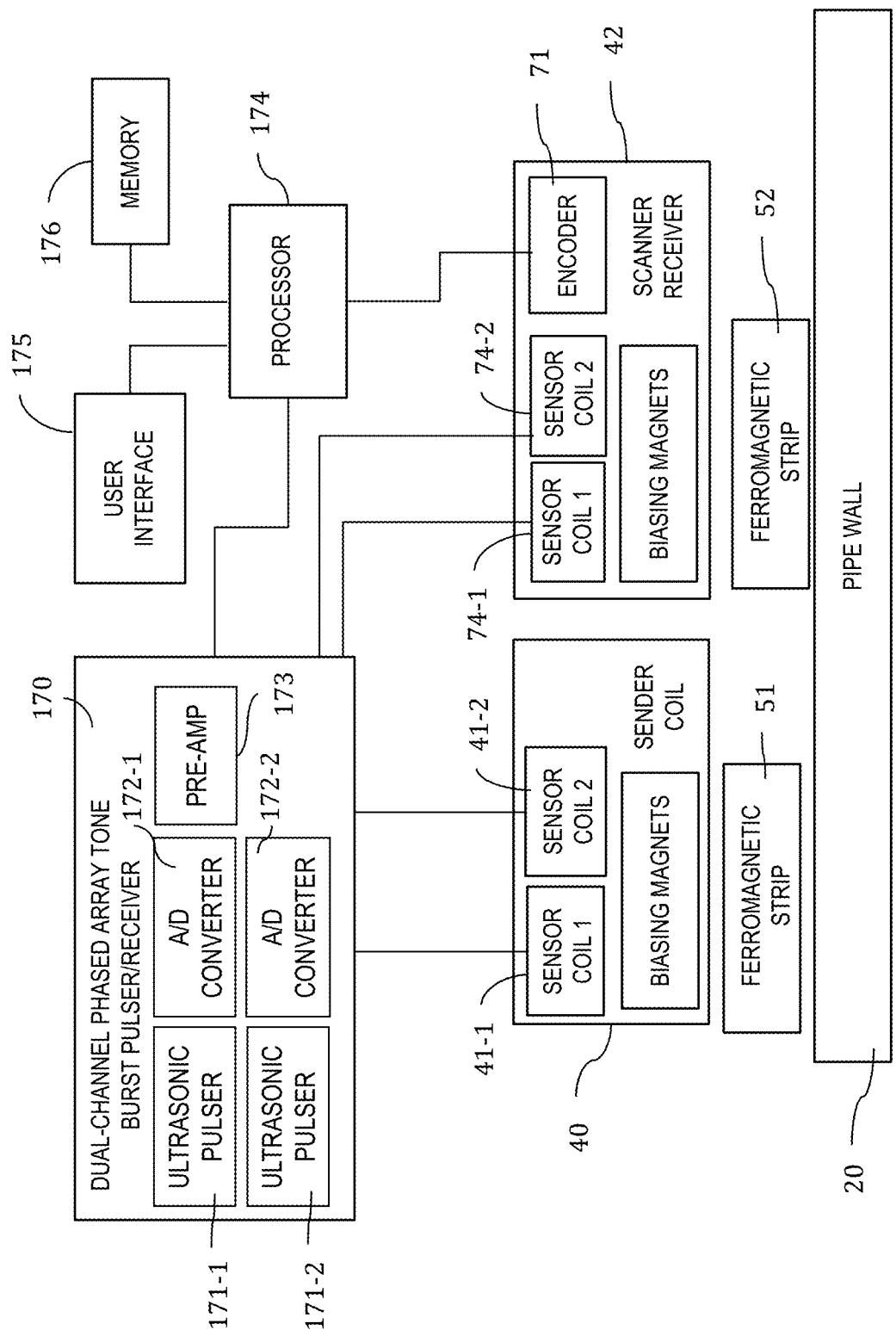
Figure 19B:
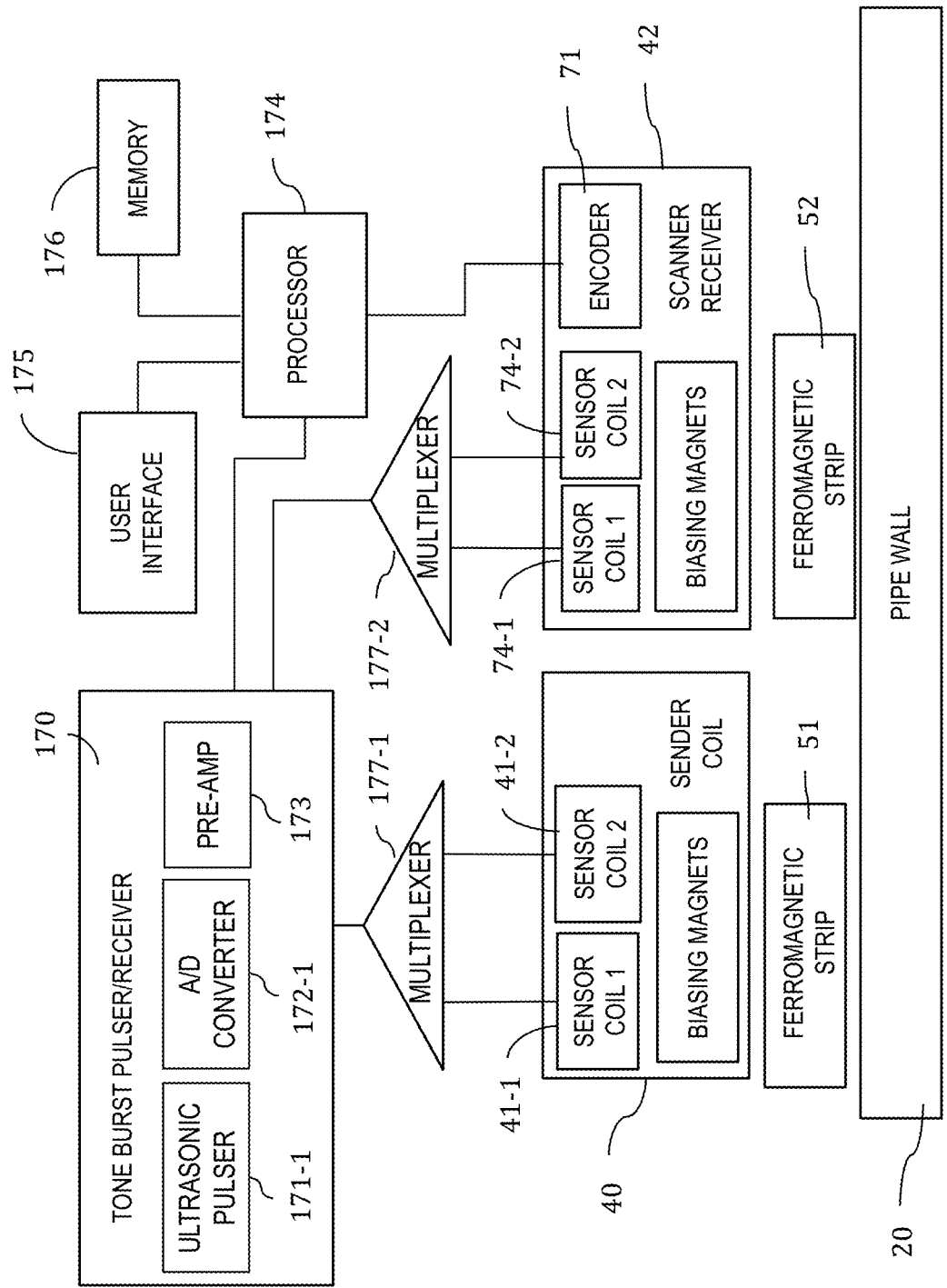
Figure 20:
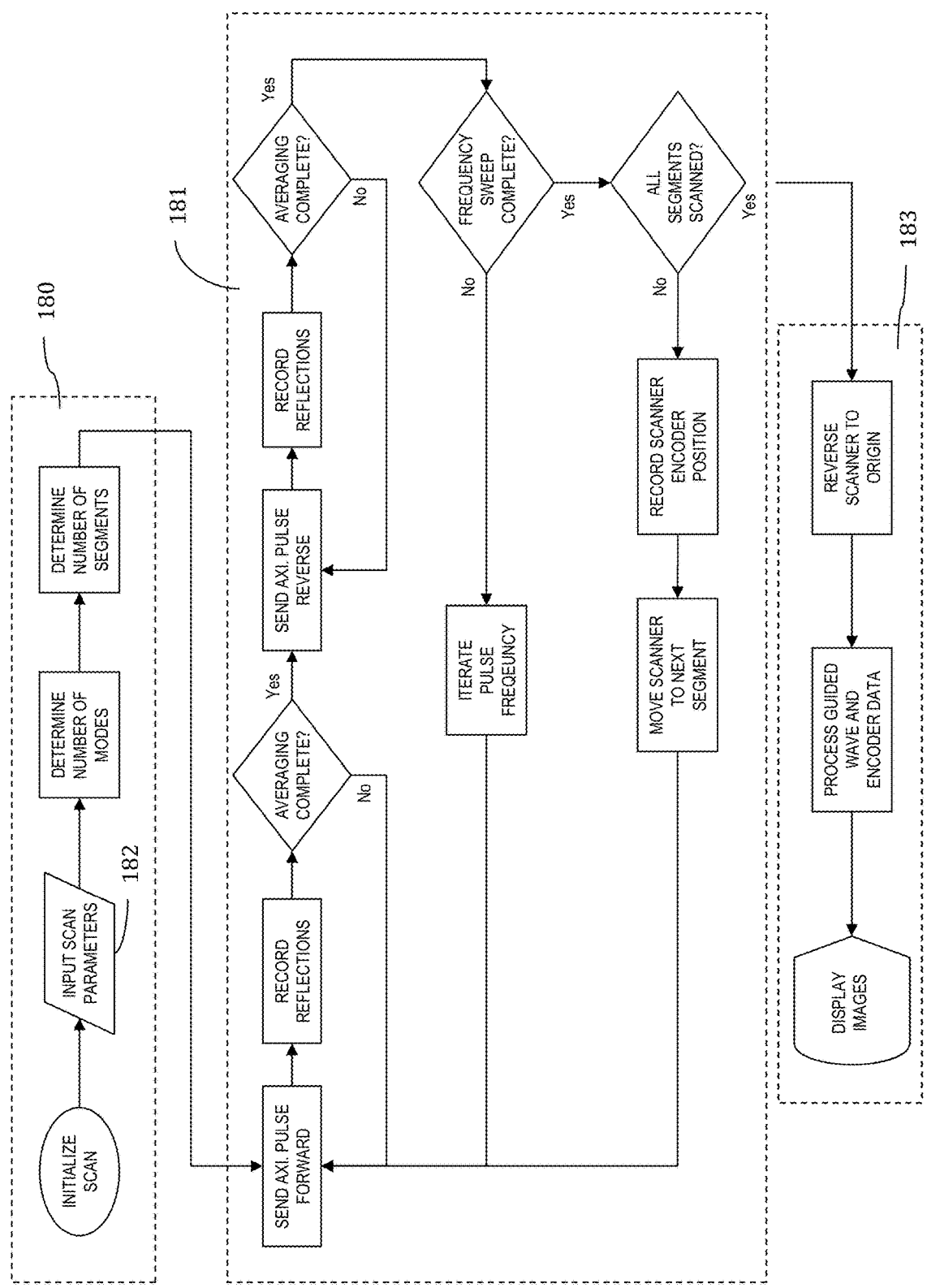
Figure 21:
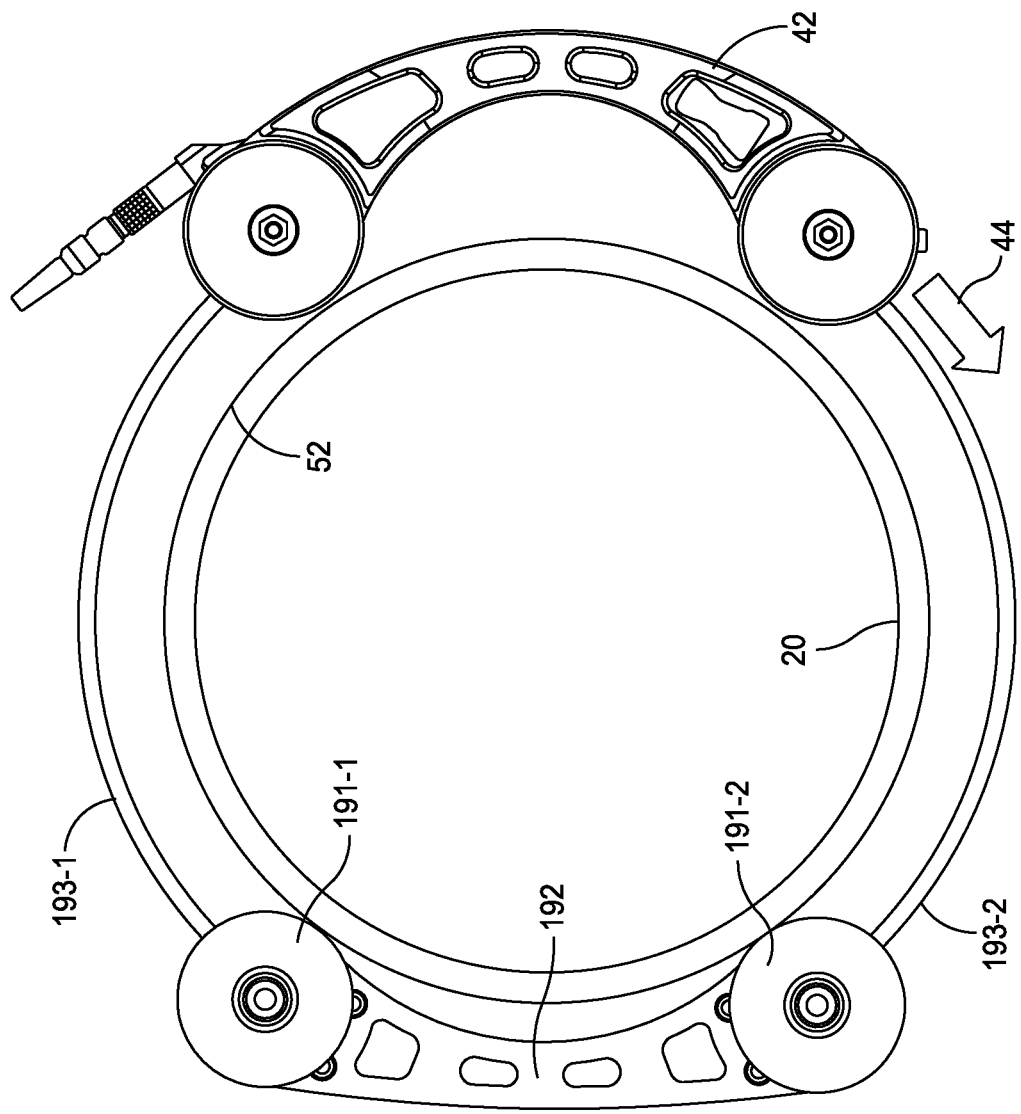
Figure 22:
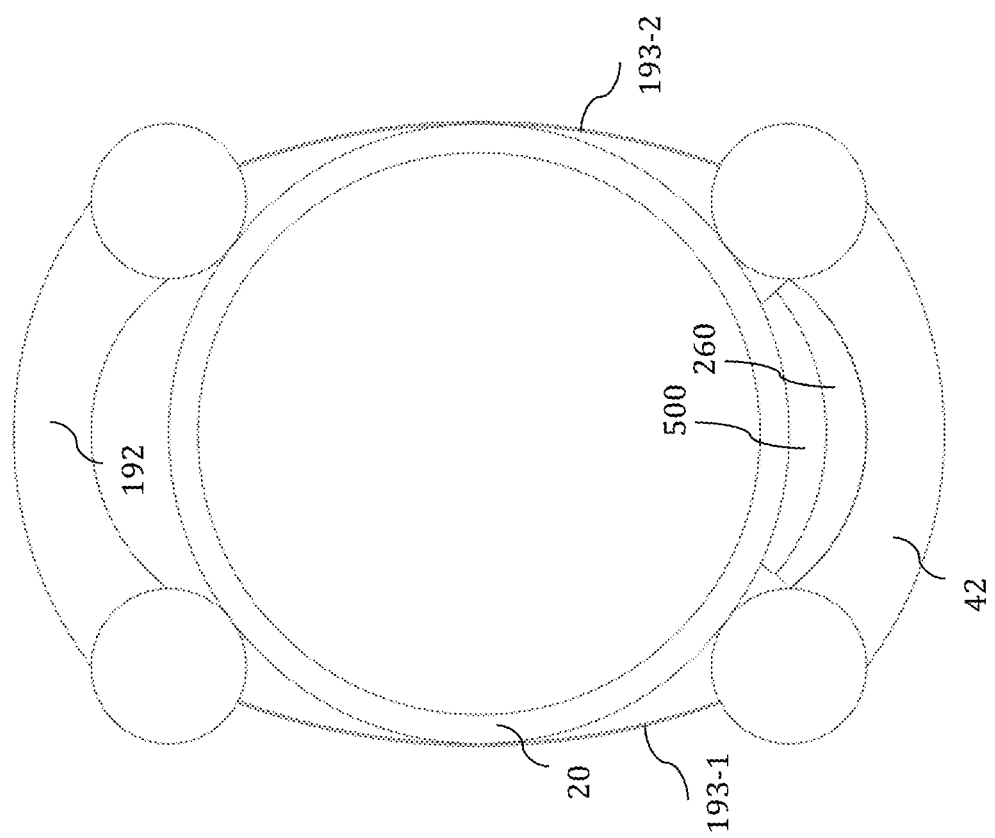
Figure 23A:
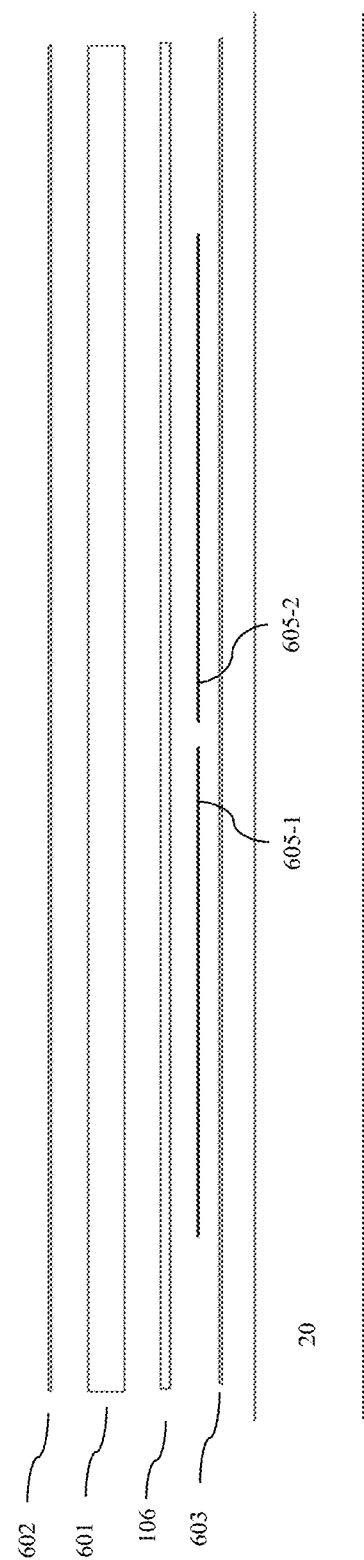
Figure 23B:
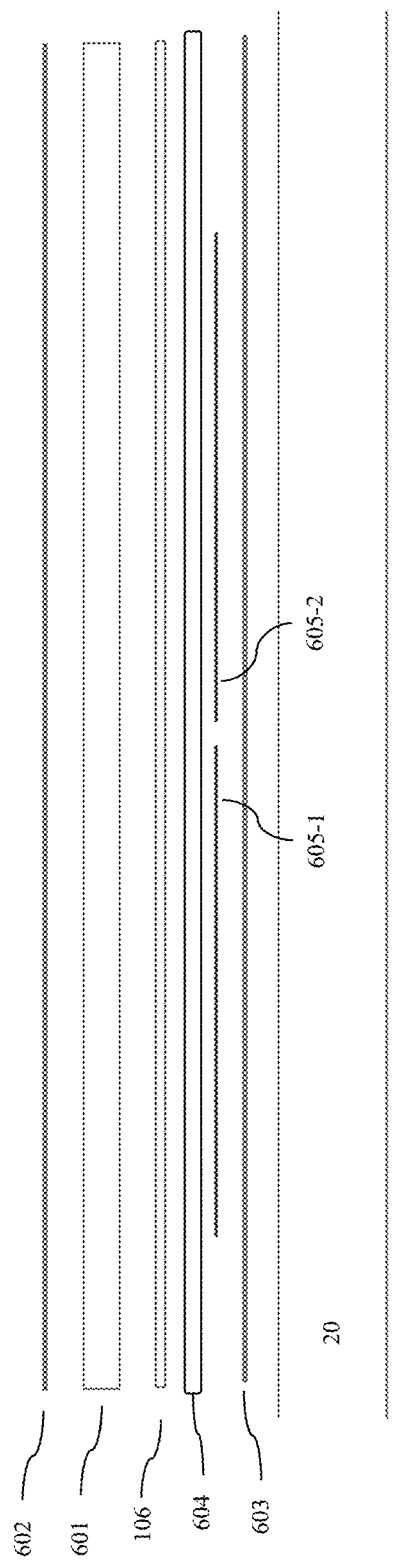
Figure 23C:
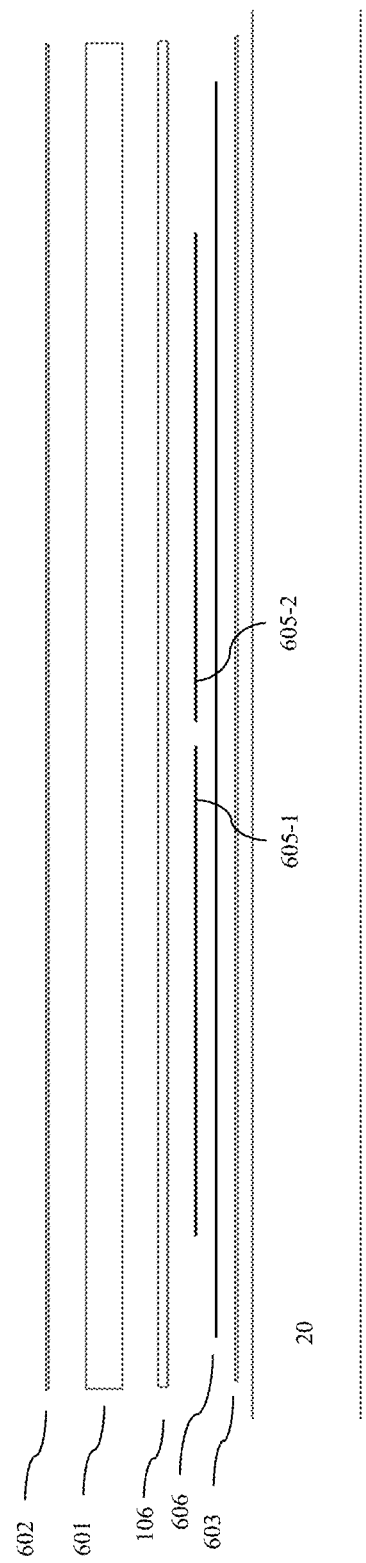
Figure 24:
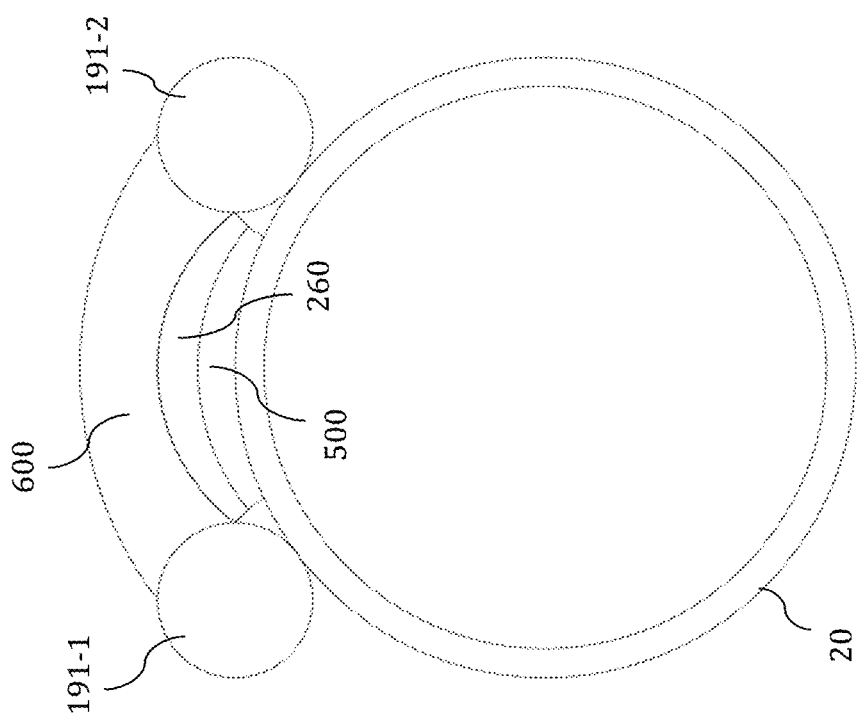
Figure 25:
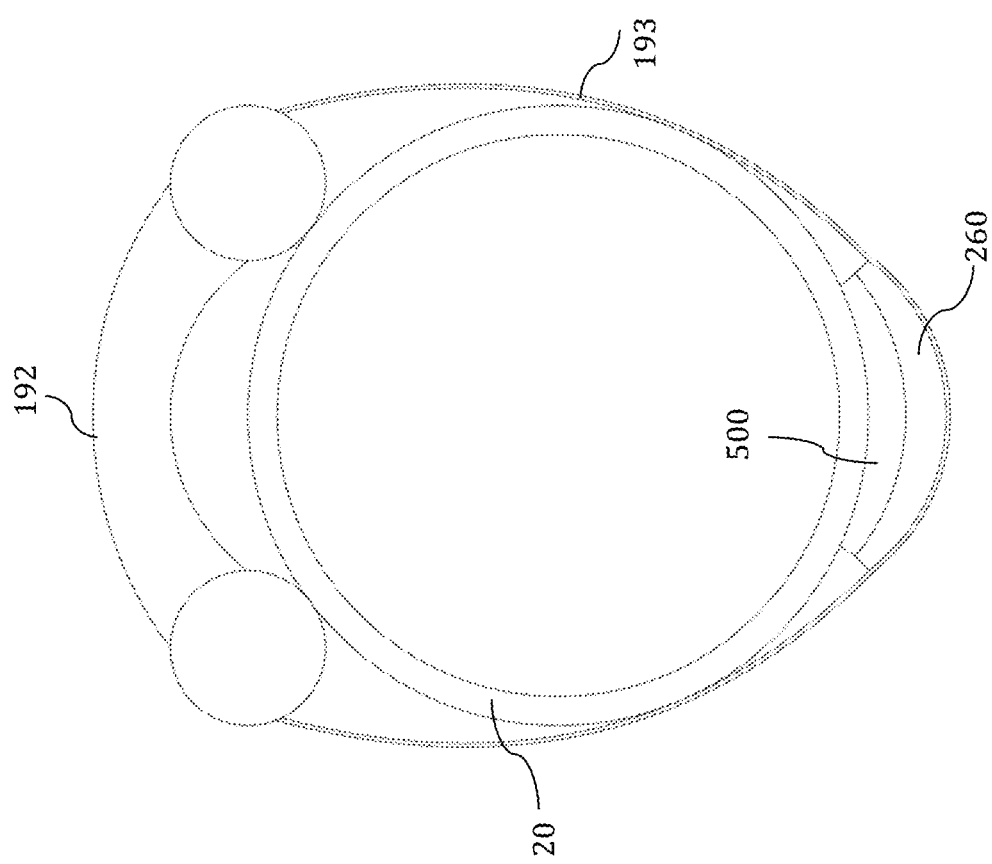
Figure 26:
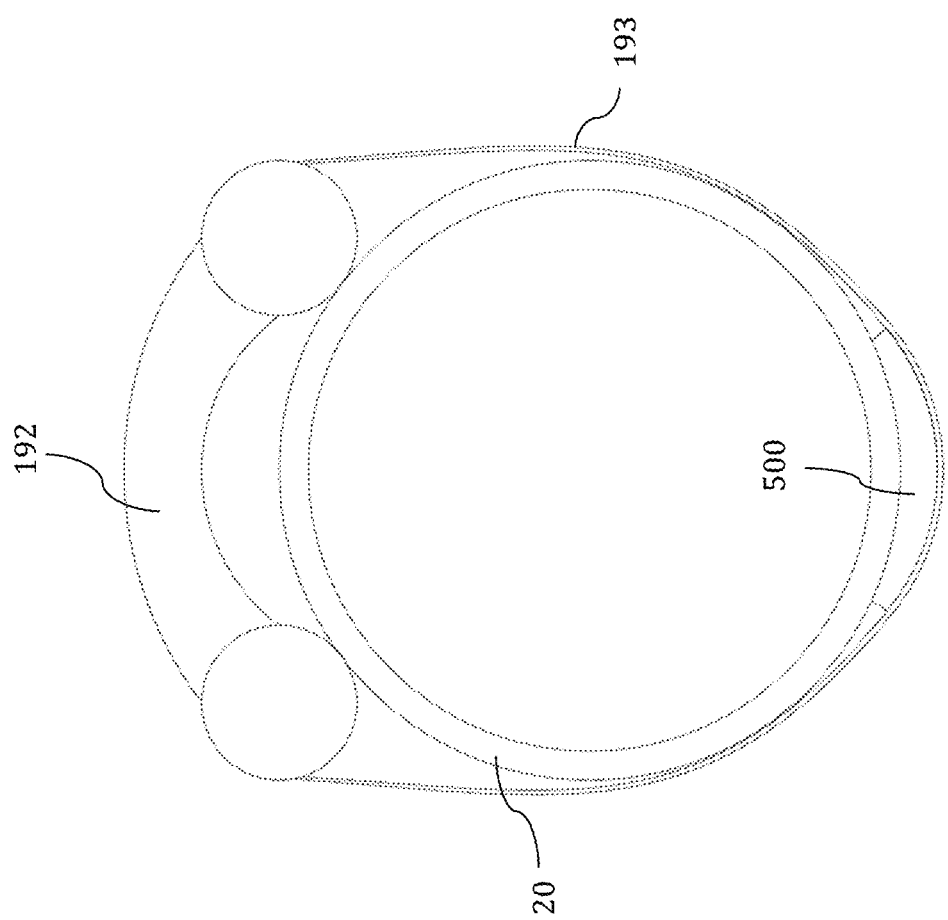

FIGS. 17A and 17B provide comparisons between a synthetic focusing scan generated by a conventional 8-segment LRUT system and a synthetic focusing scan generated by a magnetostrictive guided wave inspection system in accordance with some embodiments;

FIG. 18 is another example of a comparison between a conventional synthetic focusing scan and a synthetic focusing scan generated by a magnetostrictive guided wave inspection system in accordance with some embodiments;

FIGS. 19A and 19B are examples of a schematic illustrate of magnetostrictive guided wave inspection systems in accordance with some embodiments;

FIG. 20 is one example of a flow diagram of an inspection method in accordance with some embodiments;

FIG. 21 illustrates one example of a system including a tractor and cable for moving a scanner in accordance with some embodiments;

FIG. 22 illustrates one example of a dry-coupled scanner in accordance with some embodiments;

FIGS. 23A-23C illustrate one example of a sensor package in accordance with some embodiments;

FIG. 24 illustrates one example of a dry-coupled scanner in accordance with some embodiments;

FIG. 25 illustrates another example of a dry-coupled scanner in accordance with some embodiments; and FIG. 26 illustrates another example of a dry-coupled scanner in accordance with some embodiments.

DETAILED DESCRIPTION

This description of the exemplary embodiments is non-limiting and is intended to be read in connection with the accompanying drawings, which are to be considered part of the entire written description.

Long-range ultrasonic testing ("LRUT") guided-wave techniques are often utilized for the inspection of pipelines; however, focusing-capable systems are often complex and costly due to the need for segmentation of the transducer collar. Segmentation allows the sound to be sent and received in a partial loading configuration around the circumference of the pipe. Partial receiving and, in some cases, partial loading may be required to perform both active and synthetic focusing of guided wave energy in the pipe to identify the axial and circumferential location and extent of reflectors. Segmentation of the collar also makes it difficult for the transducer collars to provide axisymmetric loading, as the segmentation often leaves inactive zones between the segments. Conventional focusing-capable long-range guided wave pipeline inspection systems typically utilize complex multi-channel phased array pulser/receiver electronics capable of sending and receiving guided waves over many channels, typically 16-24, to support transducer collars arranged into eight segments. In the case of synthetic focusing, it would be ideal to send an axisymmetric wave and then be able to receive with partial loading. It would also be advantageous in some cases to be able to increase the number of receiving locations around the circumference of the pipe without having more channels in the pulser/receiver electronics and more segments in the transducer collar. It would further be advantageous to be able to have a system in which the aperture within the segments can be larger or smaller than the length of the circumference divided by the number of circumferential channels, which manifests as partial receiver section overlap. The disclosed dry-coupling scanner technology can be utilized in LRUT scanning systems, such as those disclosed in U.S. Pat. No. 9,915,632, the entirety of which is incorporated herein by reference, to better realize these advantages.

Furthermore, due to the nature of the guided waves and associated electronics used in long-range ultrasonic testing technologies, there are inherent limitations for certain applications. Two of these limitations are the existence of an uninspectable region, i.e. 'dead zone', around the transducer and a lack of axial and lateral resolution in many applications. Due to these limitations, guided waves are often used as a screening tool for large sections of a structure. However, there exist many opportunities for guided wave applications over short and medium ranges that require greater axial and lateral resolution. Several examples of these opportunities include the detection of corrosion, cracks, and other flaws in close proximity to structural features such as supports, welds, flanges, and air-soil interfaces as well as inspection of short, inaccessible regions such as corrosion under pipe supports (CUPS). Therefore, a medium-range guided wave scanner can be utilized advantageously to yield two-dimensional scan images featuring improved axial and lateral resolution and featuring a small dead zone compared to conventional guided wave inspection systems. The disclosed dry-coupling scanner technology can be applied to medium-range ultrasonics testing ("MRUT"), such as that disclosed in U.S. Pat. No. 10,119,942, the entirety of which is incorporated herein by reference, to better realize these advantages.

Guided waves are formed from the constructive interference of ultrasonic bulk waves that have interacted with the boundaries of the structure in which they propagate. A conceptual illustration is provided in FIG. 1. In this illustration, an ultrasonic transducer is used to generate either bulk waves or guided waves to detect the corrosion defect. Guided waves are unique in the sense that they are capable of propagating for longer distances compared to traditional ultrasonic waves and can be used to inspect hidden/inaccessible structures like buried or cased piping and tubing. Unlike "spot-checking" with traditional ultrasonic techniques, guided waves provide a 100% volumetric inspection. Furthermore, guided waves provide an efficient and cost-effective means of inspection due to increased inspection speed and simplicity.

Various means of guided wave transduction exist including piezoelectric transducers, electromagnetic acoustic transducers ("EMATs"), impact devices, and magnetostrictive transducers. Magnetostrictive transducers have been utilized for the purposes of ultrasonic guided wave generation for many decades and have more recently been utilized for the purposes of long-range pipe inspection. Medium-range ultrasonic testing ("MRUT") guided wave pipe inspection systems can inspect pipelines over distance range from less than one foot to up to twenty feet or more. Long-range ultrasonic testing ("LRUT") guided wave pipe inspection systems can inspect pipelines over distances of up to several hundred feet in each direction from a fixed transducer collar location. Both MRUT and LRUT technologies have been implemented using various means.

For the purposes of the description, the term "pipe" refers to hollow cylinders including, but not limited to, structures such as pipes, tubes, cylinders, and cylindrical vessels.

For the purposes of the description, the term "shear horizontal guided waves" refers to the class of sonic/ultrasonic guided stress waves in flat and curved plates, which have predominantly in-plane displacement fields perpendicular to the wave propagation direction. The terms "Lamb wave" and "SH wave" can be strictly defined as these types of guided waves in homogenous, linear, isotropic plates having constant thickness. However, for the purposes of this disclosure, the terms "Lamb wave" and "SH wave" will be more broadly used to describe any of the Lamb-type and SH-type waves in plate-like structures that closely match the characteristics of the waves described by these strict definitions, including plates with a small degree of curvature and anisotropic plates.

For the purposes of the description, the term "torsional guided waves" refers to the class of torsional sonic/ultrasonic guided stress waves in hollow cylinders, which have predominantly in-plane displacement fields perpendicular to the wave propagation direction. This term encompasses axisymmetric $T(0, n)$ and non-axisymmetric, i.e. flexural, $T(m \neq 0, n)$ modes in the torsional mode families of guided waves in hollow cylinders.

For the purposes of the description, the term "longitudinal guided waves" refers to the class of longitudinal sonic/ultrasonic guided stress waves in hollow cylinders, which have predominantly out-of-plane displacement fields and in-plane displacement fields parallel to the wave propagation direction. This term encompasses axisymmetric $L(0, n)$ and non-axisymmetric, i.e. flexural, $L(m \neq 0, n)$ modes in the longitudinal mode families of guided waves in hollow cylinders.

For the purposes of the description, the term "axisymmetric guided wave" refers to guided wave energy that is generally uniform around the circumference of the pipe, e.g. the $T(0,n)$ or $L(0,n)$ modes. Although pure axisymmetric mode excitation may be impossible in practice due to imperfections in loading patterns and amplitudes around the circumference of said pipe, quasi-axisymmetric waves can be effectively considered to be axisymmetric when interpreting and processing the data, especially after these waves have propagated a short distance away from the excitation source. Axisymmetric or quasi-axisymmetric excitation on a pipe predominantly excites the axisymmetric modes in said pipe.

For the purposes of the description, the term "partial loading" refers to at least one of generating and receiving guided waves in a pipe with a transducer that covers an incomplete portion of the circumference of the pipe. Partial loading excitation on a pipe excites a combination of guided wave modes in said pipe with the total energy divided among the various axisymmetric and flexural modes. Partial loading receiving on a pipe is analogously capable of detecting any of said axisymmetric flexural guided wave modes propagating in said pipe.

The magnetostrictive guided wave pipeline inspection system generates guided waves via the magnetostrictive effect, i.e. the Joule effect, by which a time-varying strain is induced in the ferromagnetic material by means of generating a time-varying current in a pulser coil in the presence of a biasing magnetic field that is perpendicular to the direction of wave propagation to generate shear-horizontal type waves, e.g. torsional waves in pipes, or parallel to the direction of wave propagation to generate Lamb-type waves, e.g. longitudinal waves in pipes. The coil traces are oriented in a manner such that they induce a time-varying magnetic field in the ferromagnetic material that is parallel to the wave propagation direction and the axis of the pipe. By this process, guided waves are generated in the structure to which the ferromagnetic material is coupled.

In some embodiments, the magnetostrictive guided wave pipeline inspection system at least one of generates and detects guided wave modes in the $T(n,1)$ family, the $L(n,2)$ family, SH-type waves and/or any other suitable family or combination of families. The magnetostrictive guided wave pipeline inspection system may be switched between generating and receiving torsional/SH-type modes and longitudinal/Lamb-type modes by reorienting the biasing magnets in the system. In some inspection scenarios, one type of guided wave mode may feature advantages over the other, and thus the ability to rapidly select and adjust the system for either type of guided wave mode excitation is advantageous.

The guided waves propagate through the structure away from the pulser coil, and reflected wave energy from any structural anomalies is subsequently detected by the scanner receiver via the inverse magnetostrictive effect, i.e. the Villari effect, in which the passing stress waves induce a time-varying magnetic field in the ferromagnetic strip, which induces a time-varying current in the receiver coil.

The ultrasonically shear coupling of said ferromagnetic strips to said pipe may be achieved by means of at least one of shear couplant, bonding, brazing, adhesive taping, and mechanical pressure coupling such that shear stresses may be transferred from said strip to said pipe and vice versa. In some embodiments, at least one of the ferromagnetic strips adjacent to the receiver coil is temporarily coupled to the pipe by means of mechanical pressure coupling.

The biasing magnetization of the at least one ferromagnetic strip may be achieved by swiping the material with a permanent magnet prior to the scan or by utilizing at least one permanent magnet or electromagnet.

The at least one pulser and receiver coils may be a flat-flexible cable or a flexible printed circuit board and may be interchangeable to generate and receive guided waves across a wide range of frequencies between 10 kHz and 2 MHz.

Various embodiments of the system pulser/receiver electronics can be used to accomplish the means of generating guided waves and receiving guided wave reflections using partial loading around the circumference of the pipe. In some embodiments, the system pulser/receiver electronics comprise at least one ultrasonic tone-burst or square wave pulse generator, at least one analog-to-digital converter, at least one pre-amplifier, and at least one of phased array and multiplexing circuitry to facilitate generating guided waves from at least one independent pulser coil and to facilitate receiving guided wave signals from at least one independent receiver coil.

By at least one of sending and receiving guided wave signals via at least two independent pulser coils separated by a known distance parallel to the axis of the pipe and two independent receiver coils separated by a known distance parallel to the axis of the pipe, directional wave control can be implemented by means of at least one of real-time time delays between said parallel coils using phased array hardware and artificial time delays between said parallel coils applied in post processing.

In some embodiments, in addition to the pulser/receiver electronics, the system includes a controller and a graphic user interface. The controller includes a machine-readable storage medium and a processor in signal communication with said machine-readable storage medium. The processor is configured to cause a pulse to be generated by the at least one sending magnetostrictive coil, measure the reflected signals detected by the at least one receiver magnetostrictive coil, process data collected at multiple locations around the circumference of said pipe, and save the waveforms and associated receiver position data in the machine-readable storage medium.

In some embodiments, the system software incorporates signal processing techniques to generate at least one of A-scans and two-dimensional synthetic focusing images of features in the pipe. The signal processing techniques utilized in the software include at least one of averaging, filtering, multi-frequency data acquisition, directional wave control, reverse wave suppression, a synthetic aperture focusing technique (SAFT), modal decomposition, and synthetic focusing.

Figure 1:
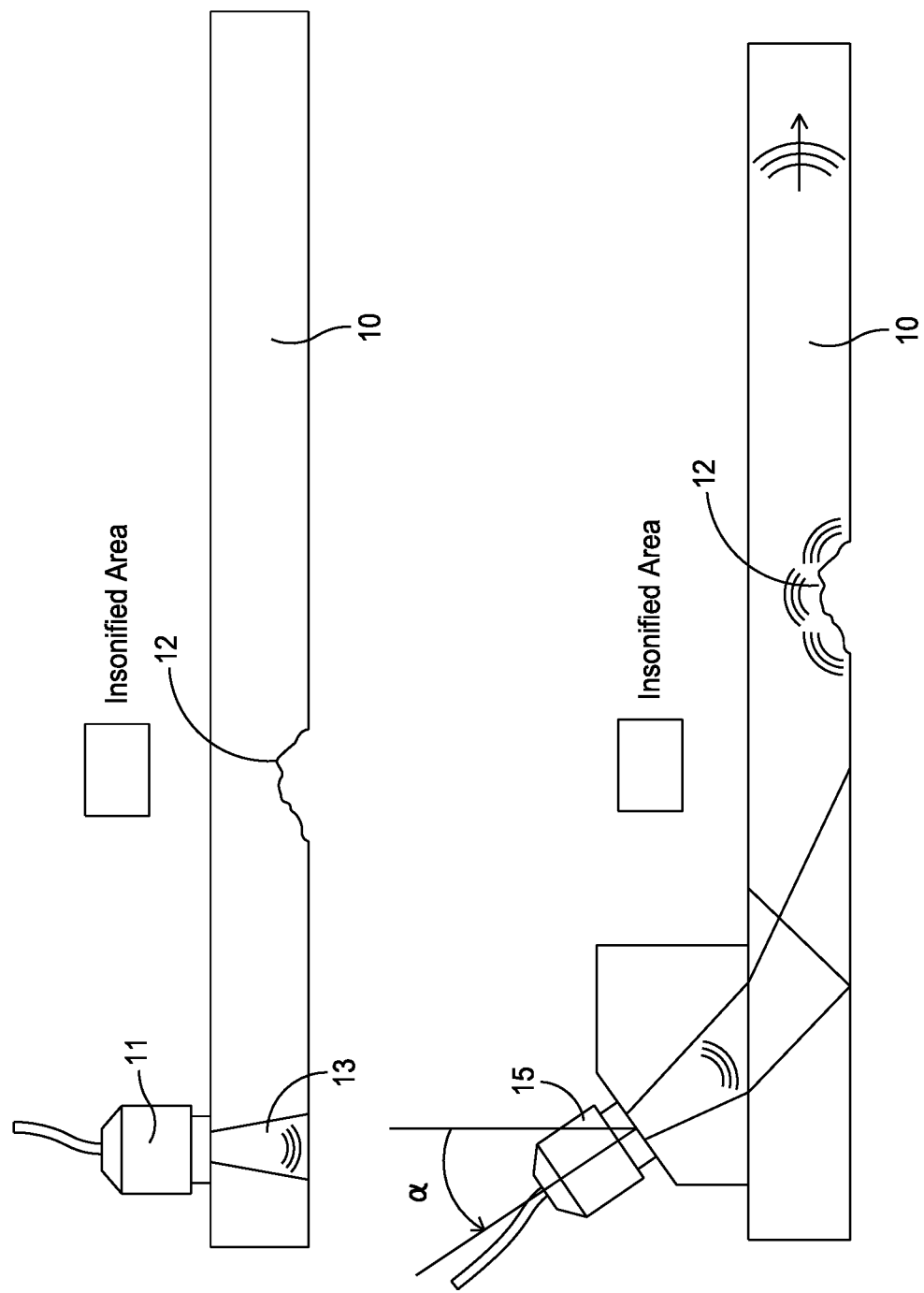
FIG. 1 is a conceptual diagram showing "spot checking" using conventional ultrasonic bulk wave inspection techniques (top) and ultrasonic guided-wave inspection (bottom)

FIG. 1 compares a an ultrasonic "bulk wave" 13 and a ultrasonic "guided wave" 14 in a plate-like structure 10, which could be representative of, for example, a pipe wall. Both types of waves are capable of detecting corrosion 12, but the bulk wave transducer 11 must be located directly above the corrosion, as it only insonifies a localized region below it. The guided wave transducer 15, on the other hand, can be located remotely from corrosion 12 and still detect it since the guided wave 14 is capable of filling the entire cross-section of the structure 10 with energy that propagates some distance away from the transducer location. This capability of extended range of propagation and remote detection beyond the location of the guided wave pulser and receiver coils is a great advantage for guided wave technologies.

Figure 2:
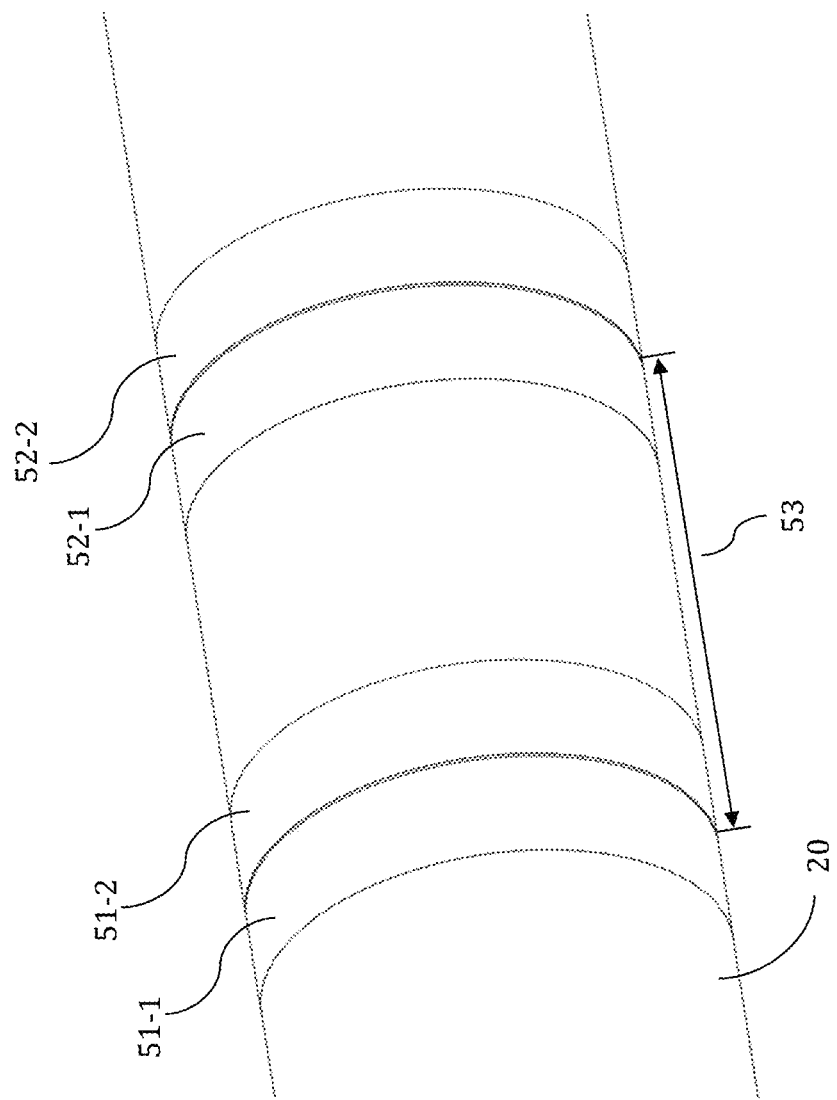
FIG. 2 illustrates one example of ferromagnetic strips ultrasonically shear coupled to a structure, such as a pipe, in accordance with some embodiments.

FIG. 2 illustrates ferromagnetic strips 51 and 52 that are ultrasonically shear coupled to pipe 20, i.e. coupled such that shear stresses may be transferred from strip 51 to pipe 20 and from pipe 20 to strip 52, and vice versa. In some embodiments, this coupling is achieved by mechanical dry coupling via external pressure for at least one strip. The ferromagnetic strips 51, 52 can comprise any suitable material, such as an iron-cobalt alloy in some embodiments.

Figure 3A:
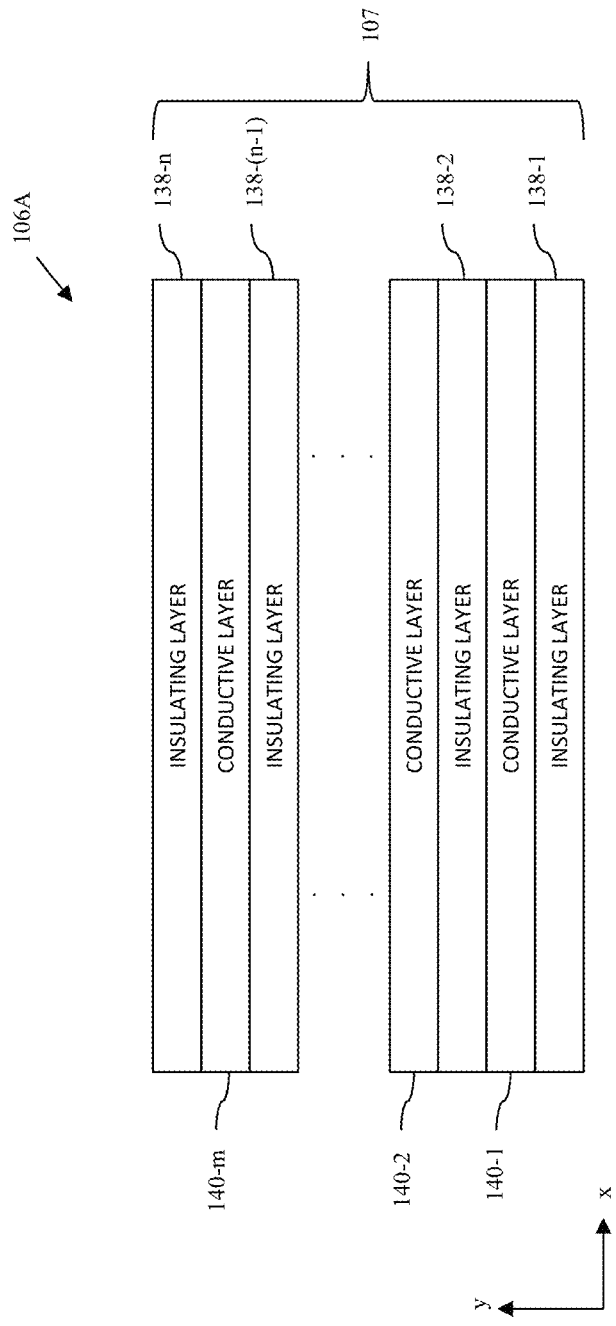
FIG. 3A is a cross-sectional view of a pulser/receiver coil circuit formed in a circuit board in accordance with some embodiments.

One example of a magnetostrictive pulser/receiver coil circuit 106 is illustrated in FIGS. 3A-3D. FIG. 3A is a cross-sectional view a pulser/receiver coil circuit 106A formed in a circuit board 107, which includes a plurality of insulating layers 138-1, 138-2, . . . , 138-n ("insulating layers 138") and a plurality of conductive layers 140-1, 140-2, . . . , 140-m ("conductive layers 140") stacked in the y-direction in an alternating manner. Insulating layers 138 and conductive layers 140 form a printed circuit board ("PCB"). In some embodiments, the PCB is a flexible PCB and insulating layers 138 are formed from a polyimide, silicone, or other flexible insulating material, and conductive layers 140 are formed from copper or another conductive material.

Figure 3B:
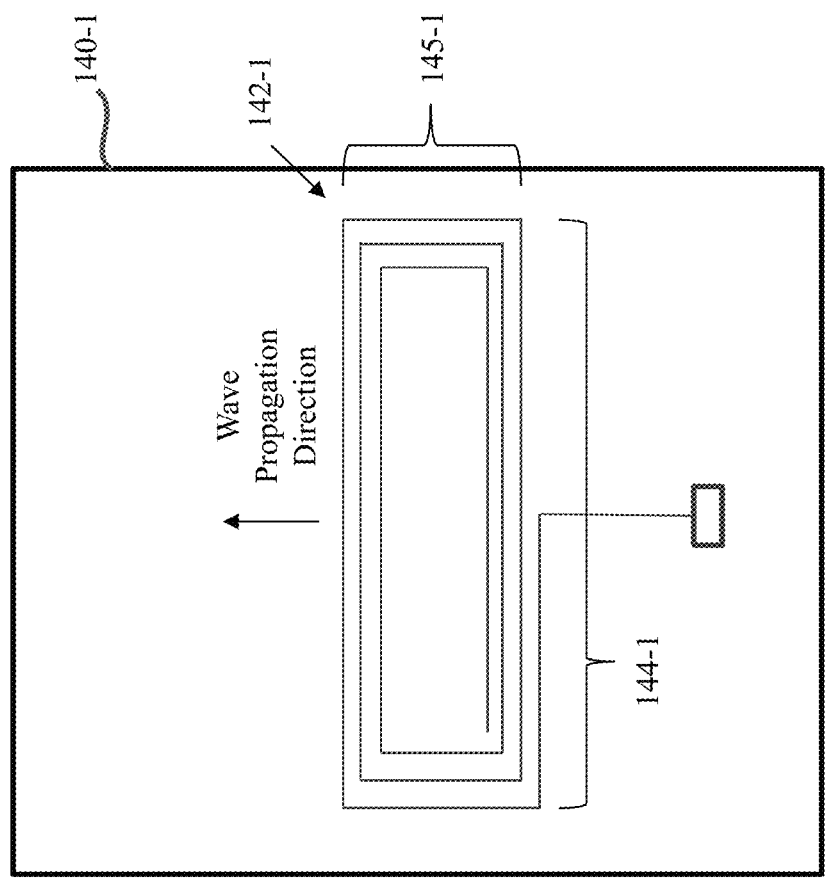
FIGS. 3B-3E illustrate examples of coils formed in conductive layers of a circuit board in accordance with some embodiments.
Figure 3C:
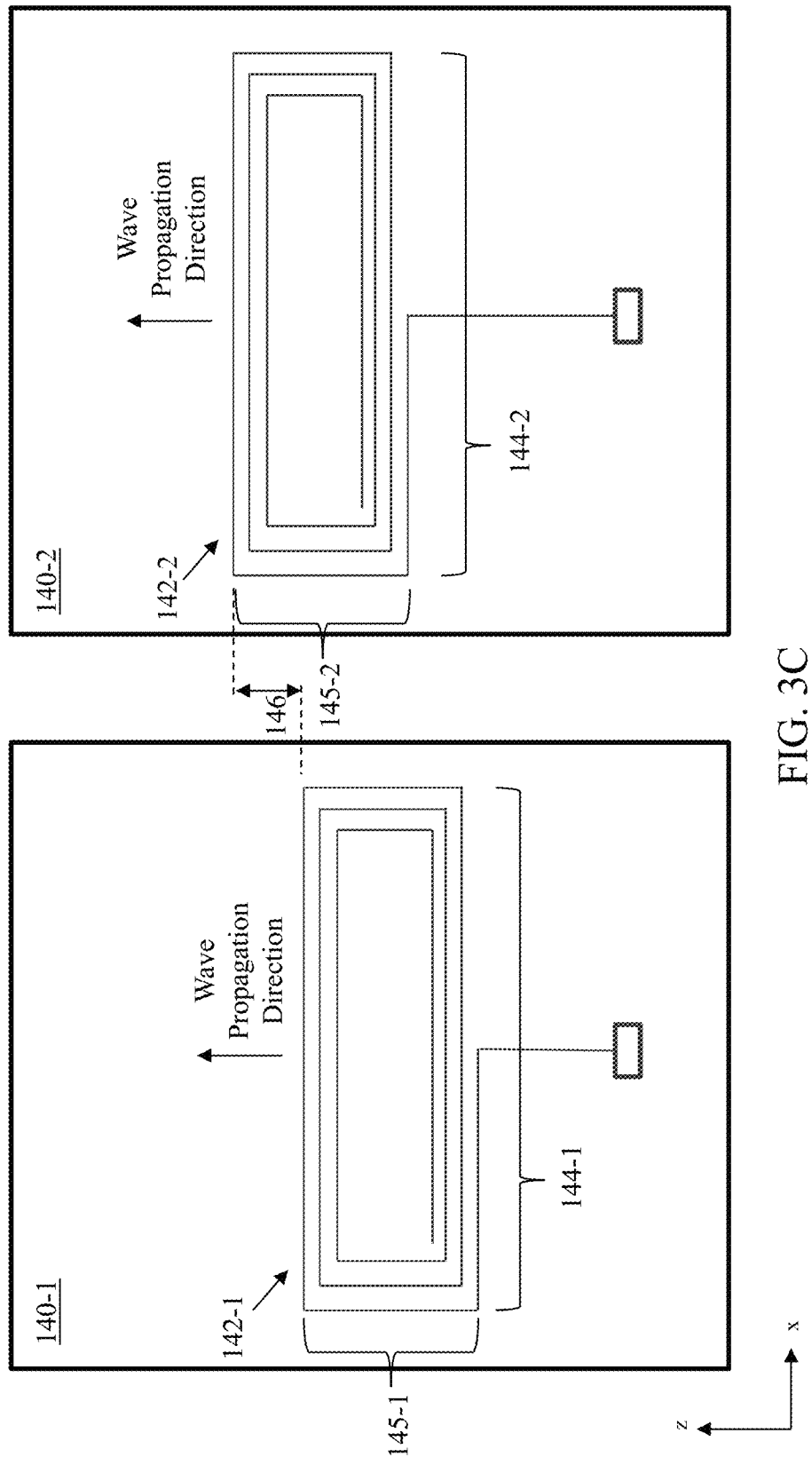
Figure 3D:
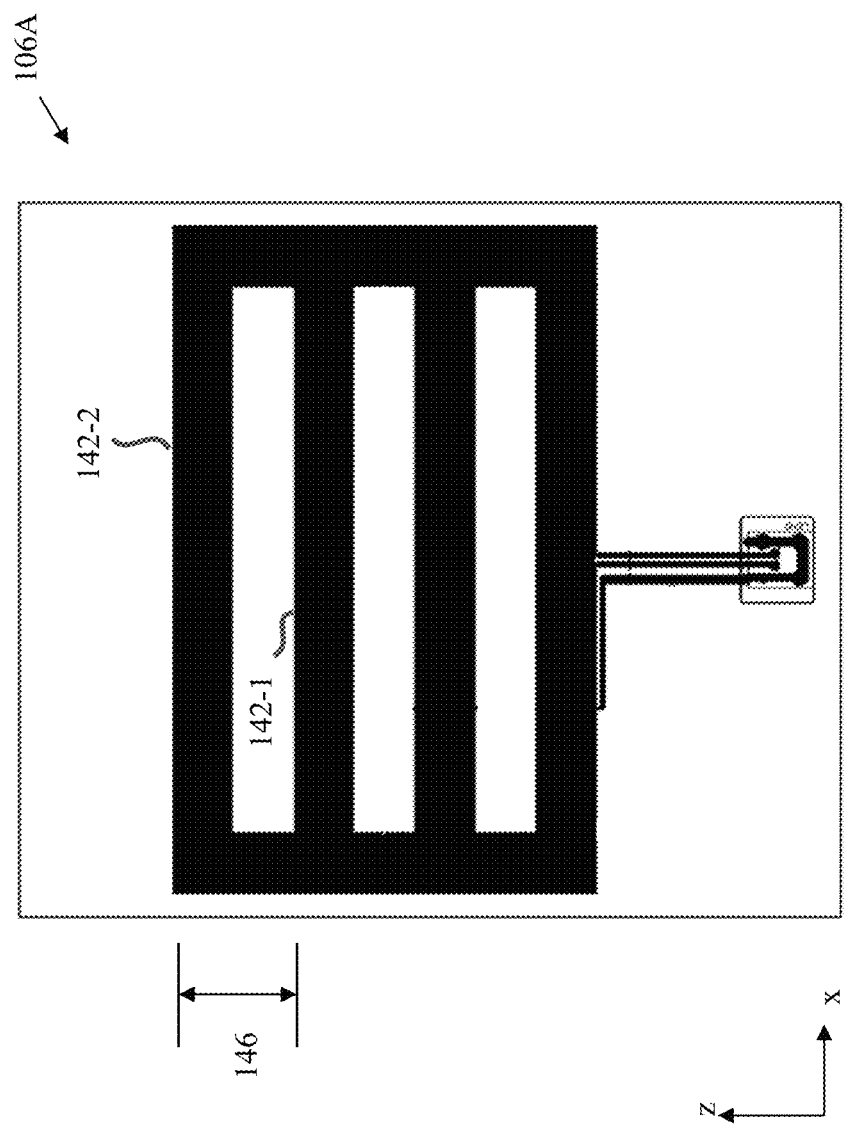
Figure 9:
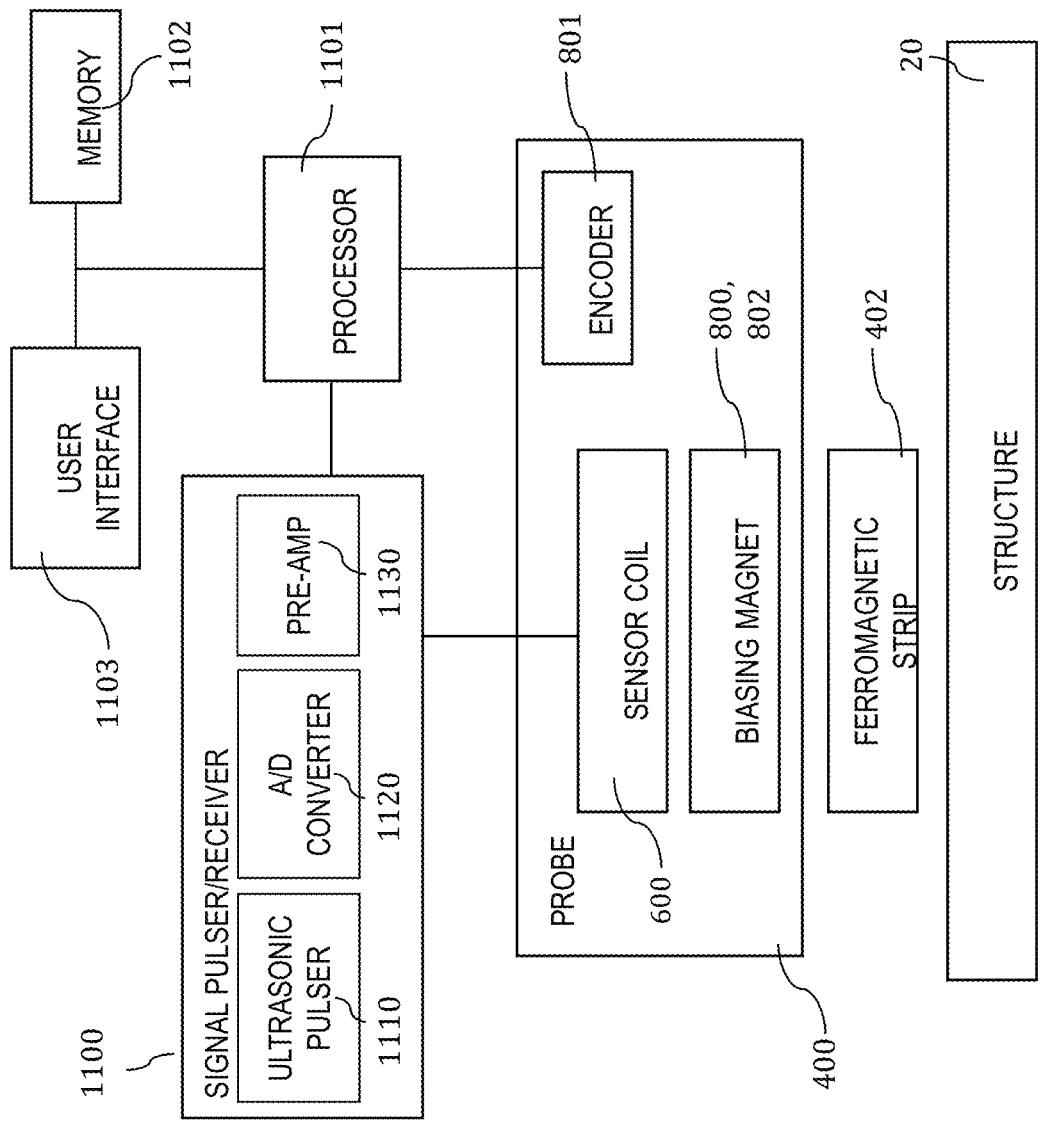
FIG. 9 is a block diagram of one example of a system using a ferromagnetic strip for scanning a structure in accordance with some embodiments.

Each conductive layer 140 may include one or more coils 142 (comprising a loop of conductive material, such as copper as shown in FIGS. 3B-3D) for producing a dynamic magnetic field in the magnetostrictive/ferromagnetic material in response to signals received from the signal generator/receiver 1100 of the controller (FIG. 9).

FIG. 3B illustrates one example of a plan view of a first coil 142-1 formed in a single conductive layer, e.g., conductive layer 140-1, of a multi-layer circuit board, such as a multi-layer circuit board 107 shown in FIG. 3A. Coil 142-1 may include a number of closely-spaced narrow traces that are arranged in a spiral configuration such that the overall coil 142-1 has a generally rectangular shape as illustrated in FIG. 3B. Coil 142-1 is configured to generate a wave that propagates in the z-direction with the coil 142-1 having an active area 144-1 along its length that extends perpendicular to a direction in which the generated wave propagates (e.g., in the x-direction). The portions of coil 142-1 that extend parallel to the direction of propagation of the propagating waves, i.e., those portions of coil 142-1 that extend parallel to the z-direction, may be referred to as the ineffective area 145-1 of coil 142-1.

As noted above, each conductive layer 140 of the multi-layer circuit board 107 shown in FIG. 3A may include a respective coil 142 as shown in FIGS. 3B-3E. The coils 142 formed in the different conductive layers 140 may be offset from one another in the z-direction. For example, FIG. 3C is a plan view of a first coil, e.g., coil 142-1, formed in a first conductive layer, e.g., conductive layer 140-1, disposed adjacent to a second coil, e.g., coil 142-2, formed in a second conductive layer, e.g., conductive layer 140-2. FIG. 3D is a plan view of the circuit 106 shown in FIG. 3C where the coils 142-1, 142-2 are simplified and shown as large, solid lines. As shown in FIGS. 3C and 20D, coil 142-1 in the first conductive layer 140-1 is offset in the z-direction relative to coil 142-2 formed in the second conductive layer 140-2 (or vice versa) as indicated by reference numeral 146. The coils 142-1, 142-2 in the different conductive layers 140-1, 140-2 are conductively isolated from one another by an intervening insulating layer, such as insulating layer 138-2 shown in FIG. 3A. Offsetting the active areas 144-1, 144-2 of coils 142-1, 142-2 enables a wave to be generated in a single direction (e.g., towards the bottom of the page in FIGS. 3C and 3D) as the wave propagating in the opposite direction (e.g., towards the top of the page in FIGS. 3C and 3D) is canceled (through destructive interference) due to the offset and the manner in which the control signals received from signal generator/receiver 1100 (FIG. 9) actuate coils 142-1, 142-2 as will be understood by those of ordinary skill in the art.

Figure 3E:
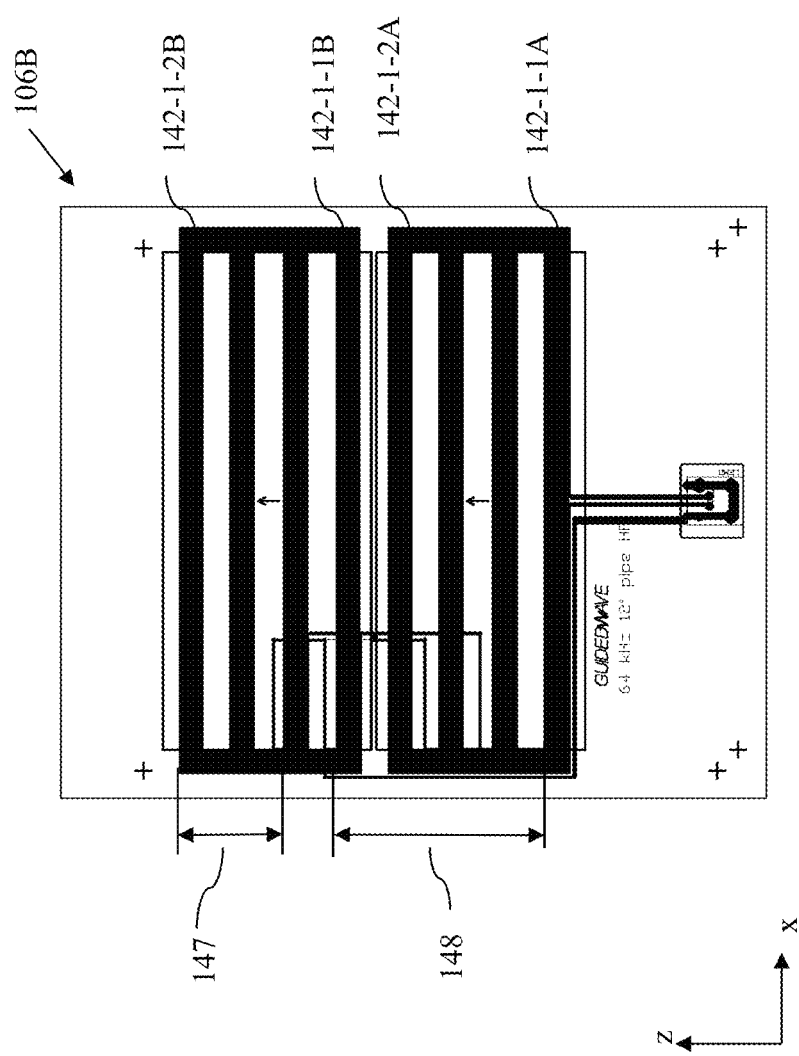

As described above, the number of conductive layers 140 that include coil(s) 142 may be varied. For example, FIG. 3E illustrates an example of a coil circuit 106B that is comprised of two subsets of coils 142, denoted by the letters "A" and "B" for the first and second coil subsets, respectively. The coil segments 142-1-1A and 142-1-2A are offset in the z-direction from their respective pairs 142-1-1B and 142-1-2B, respectively be a distance denoted by reference numeral 148. Note that the addition of multiple subsets of coils can be advantageous in increasing the signal amplitude and sensitivity of the sensor system. The offset in the z-direction of the upper and lower active areas of coil 142-1-2B is denoted by reference numeral 147 and is common for all individual coil segments. The offset 147 is equal to ½ the offset denoted by 148. Furthermore, the offset 146 denoted in FIG. 3C is equal to ¼ of offset 148. The magnetostrictive coil 106B will most effectively generate and receive guided waves with a wavelength equal to 148 in this configuration; thus, the center of the wavelength spectrum of the guided waves generated by said coil circuit 106B can be controlled by adjusting offsets 148, 147, and 146 accordingly. A person of ordinary skill in the art will understand that said wavelength spectrum can be converted into an equivalent frequency spectrum for excitation of a guided wave mode with a known phase velocity.

Figure 4A:
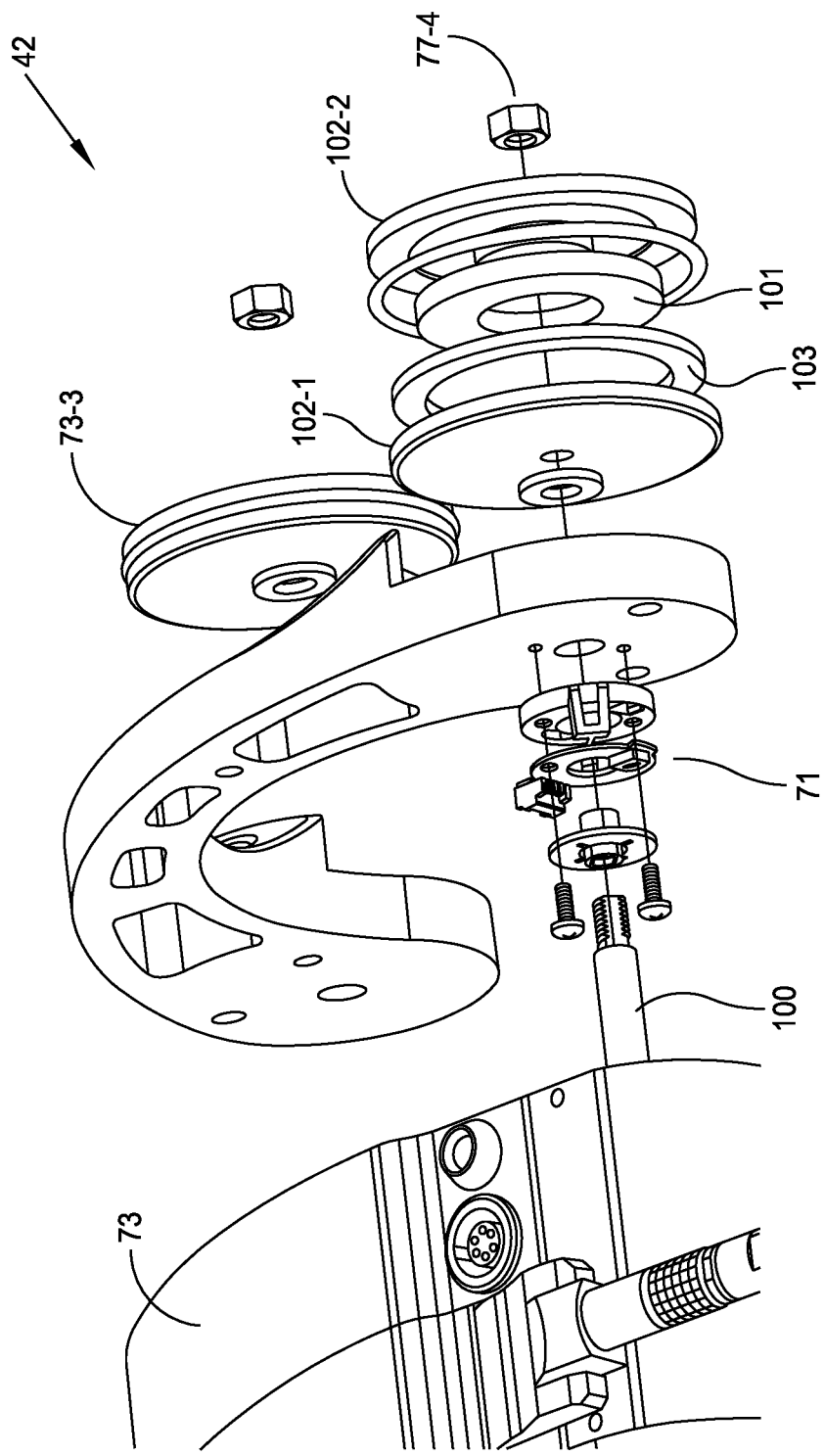
FIG. 4A illustrates one example of a scanner/receiver in accordance with some embodiments.

FIG. 4A illustrates one example of the scanner receiver 42 in accordance with some embodiments. In some embodiments, the position encoder 71 is located within an internal compartment defined by the probe body 73 and is mounted directly to one of the probe axles 100 such that the position encoder 71 need not be in direct contact with the structure being scanned. In some embodiments, said encoder 71 can be mounted internally or externally to the probe body 73 such that the position encoder 71 is in contact with the pipe 20 being scanned. In some embodiments, the wheels 77 are magnetic to maintain contact with said pipe, while in other embodiments, the wheels are not magnetic. In embodiments for which the wheels 77 are magnetic, said wheels 77 include an inner magnetic core 101, outer wheel plates 102-1 and 102-2 ("wheel plates" 102) composed of a suitable material, such as mildly-magnetic stainless steel, and in contact with core 101, and at least one non-magnetic ring 103 between wheel plates 102.

Figure 4B:
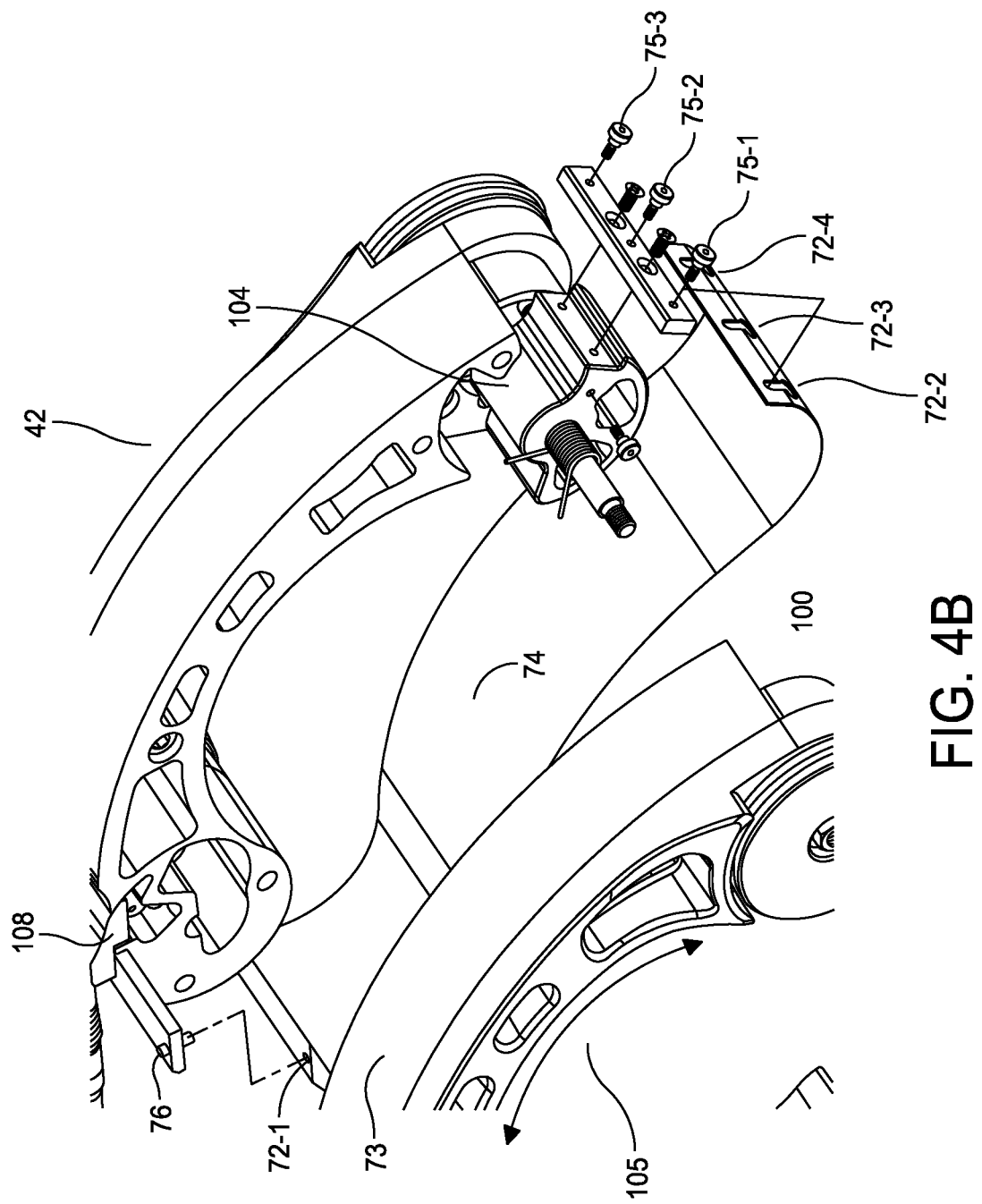
FIG. 4B is another view of the scanner/receiver illustrated in FIG. 4A, in accordance with some embodiments.

FIG. 4B further illustrates an example of the scanner receiver 42. In some embodiments, receiver coil 74 is interchangeable to easily facilitate replacement or use of a coil with different functional properties, some examples of which have been described in detail elsewhere in this description. For example, and as best seen in FIG. 4B, a set of hooks 75-1, 75-2, and 75-3 ("hooks" 75), a pair of pins 76, corresponding holes 72-1, 72-2, 72-3, and 72-4 ("holes" 72) on said flexible receiver coil 74, and spring-loaded coil capture device 108 facilitate the easy removal and installation of receiver coils without a need for adjusting any fasteners.

In some embodiments, probe body 73 is designed with a curvature 105 that allows it to accommodate pipes 20 with a predefined range of diameters in conjunction with coil tensioner 104. For example, in some embodiments, the probe body 73 is configured to accommodate pipes 20 and/or other structures having a diameter of about 4.5", a diameter of 4.5" or greater, a diameter of 4.5" or smaller, and/or any combination of diameters. Coil tensioner 104 works by placing tension on the flexible receiver coil 74 with a cam and torsion spring coil tensioner 104, which allows the length of said coil 42 in contact with the pipe to change according to the diameter of said pipe while wheels 77 remain in contact with said pipe.

Figure 5A:
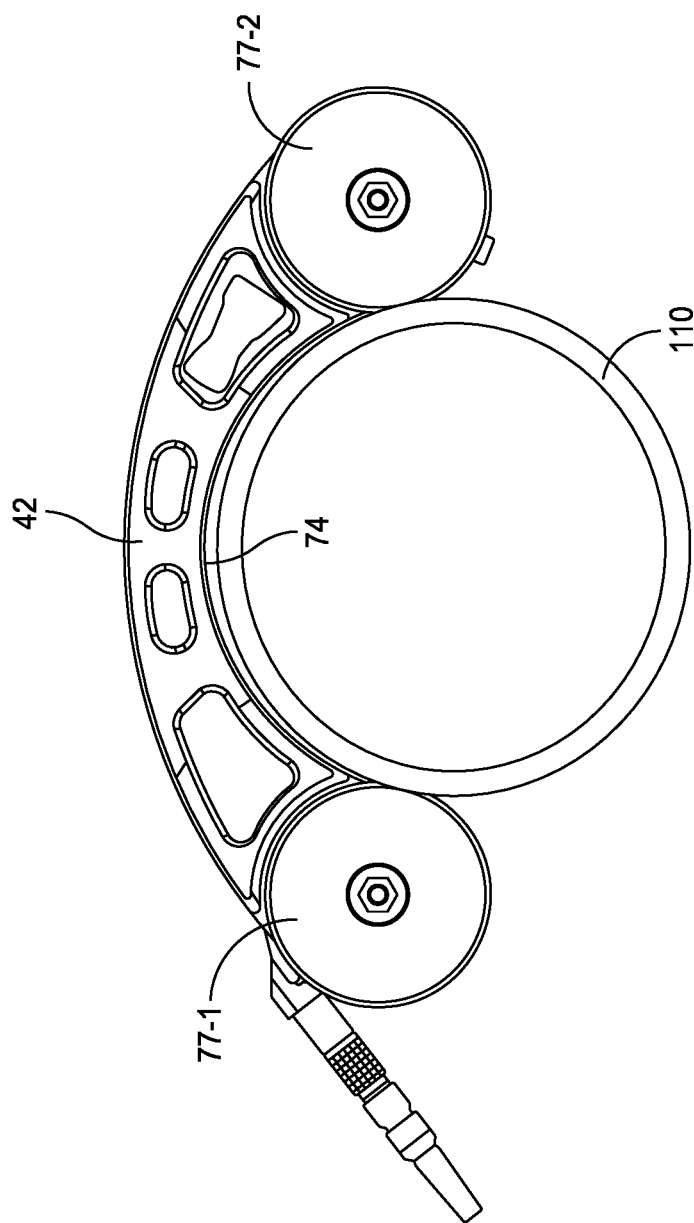
FIGS. 5A and 5B illustrate a examples of a probe body coupled to a curved body in accordance with some embodiments.
Figure 5B:
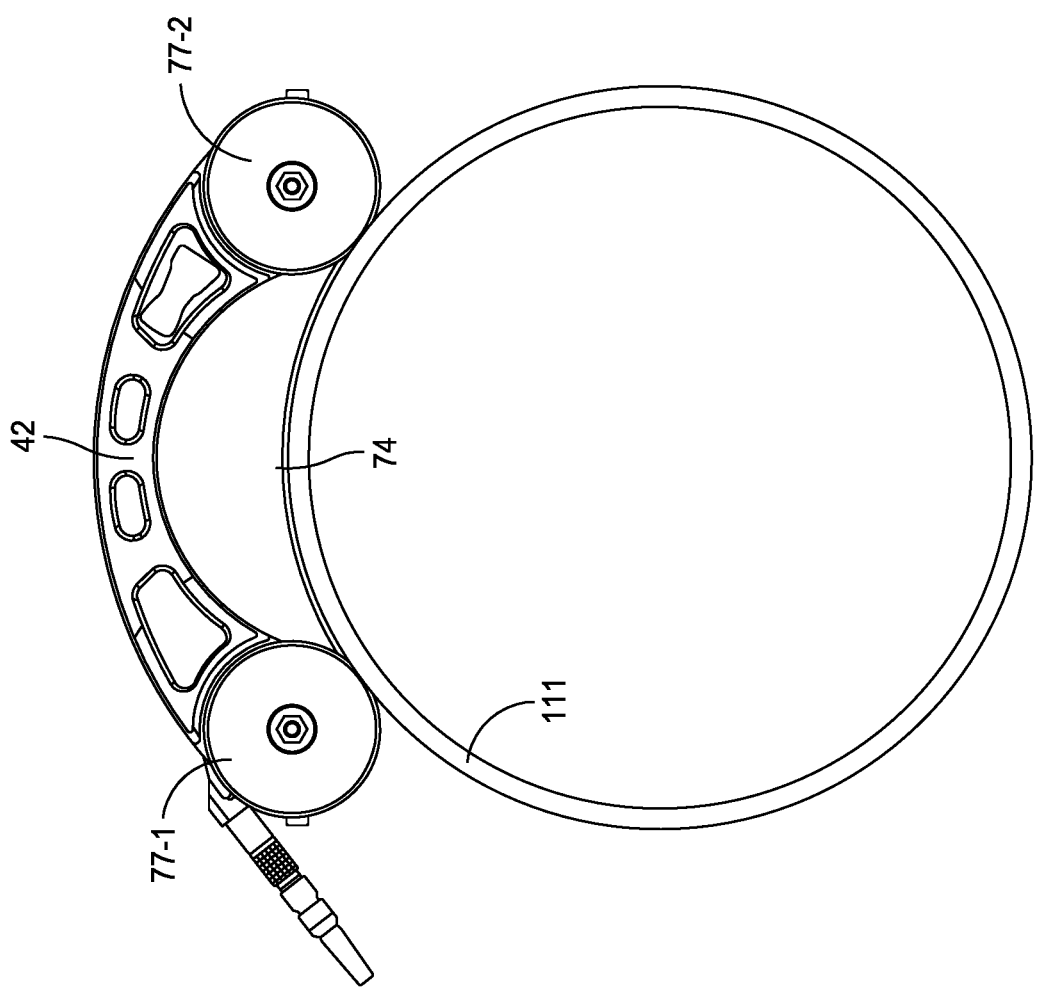

FIGS. 5A and 5B further illustrate this concept for a smaller-diameter 4" NPS pipe 110 in FIG. 5A and a larger-diameter 8" NPS pipe 111 in FIG. 5B, for example. In some embodiments, the scanner receiver 42 is designed to accommodate pipe diameters 4" NPS (4.5" outer diameter) and greater, up to and including flat plates (i.e., infinite diameter). In some embodiments, the probe 42 is designed to accommodate pipe diameters ¼" NPS (0.5" outer diameter) and greater, up to and including flat plates (i.e., infinite diameter).

MRUT Embodiments

In some embodiments, the disclosed dry-coupled scanner technology is implemented as part of an MRUT scanning system, such as those disclosed in U.S. Pat. No. 10,119,942, the entirety of which is incorporated herein by reference.

Figure 6A:
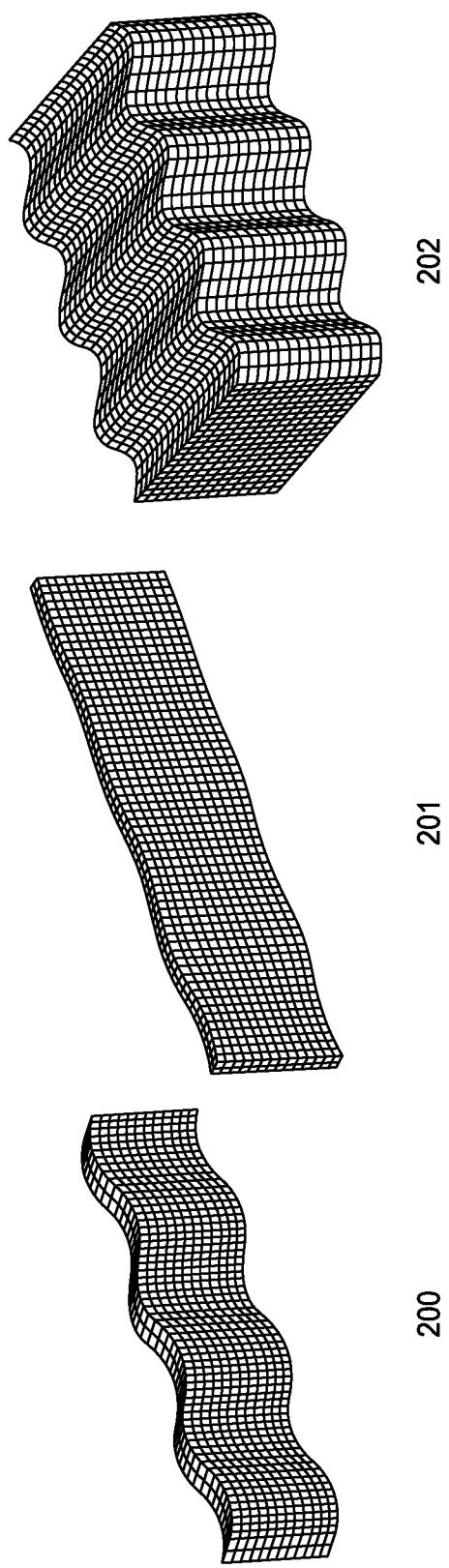
FIG. 6A illustrates the general propagation characteristics of different mode types in accordance with some embodiments.

In plates and plate-like structures, i.e., structures whose radius of curvature is much greater than their thickness, there are two primary types of guided wave modes that can be excited: Lamb and shear horizontal (SH). The general propagation characteristics of these two mode types are illustrated in FIG. 6A, wherein a cross-sectional view of a solid plate under deformation induced by an $A_0$ Lamb wave 200, an $S_0$ Lamb wave 201, and an SH wave 202 are illustrated. In some embodiments, SH-type waves, which have the defining characteristic of generating only in-plane lateral vibration as they propagate through a structure, are used. On the other hand, Lamb-type waves generate out-of-plane vibration and in-plane vibration parallel to the wave propagation direction as described in Rose, J. L., *Ultrasonic Waves in Solid Media*, Cambridge University Press, New York, N.Y., 2004, the entirety of which is incorporated by reference herein.

Figure 6B:
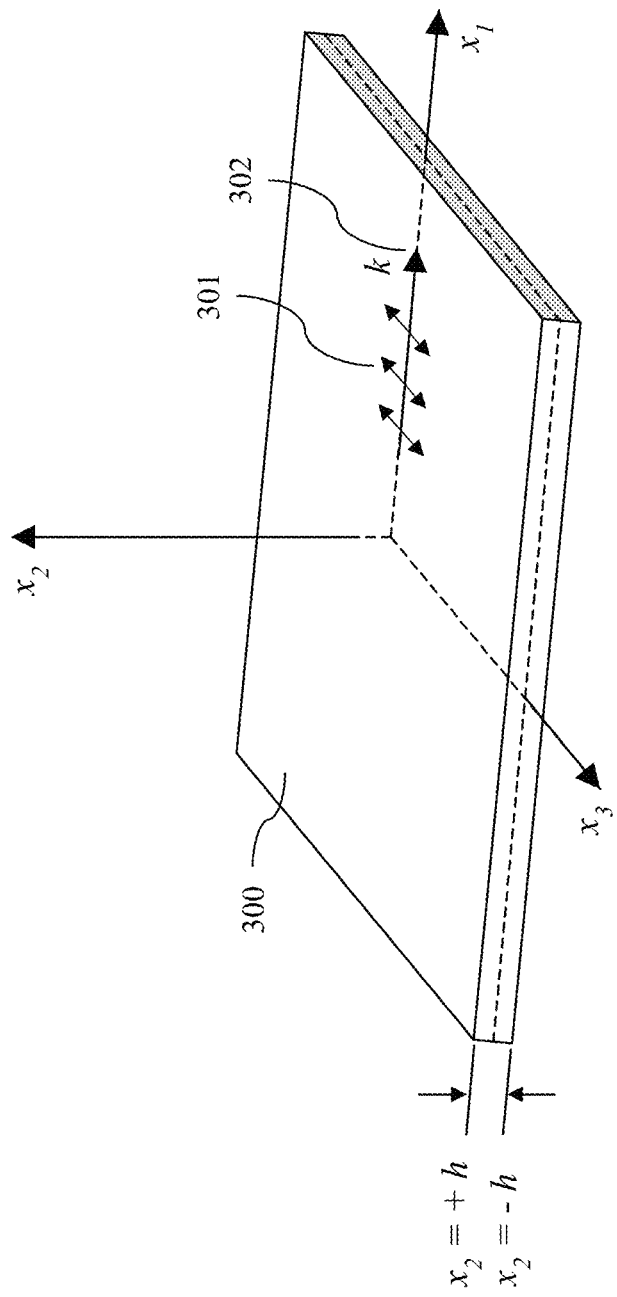
FIG. 6B illustrates one example of SH-type waves having an in-plane lateral vibration in accordance with some embodiments.

FIG. 6B illustrates the concept of SH-type waves having in-plane lateral vibration 301 that are perpendicular to the wave propagation direction 302 in a plate 300. The terms "Lamb wave" and "SH wave" can be strictly defined as these types of guided waves in homogenous, linear, isotropic plates having constant thickness. However, for the purposes of this disclosure, the terms "Lamb wave" and "SH wave" will be more broadly used to describe any of the Lamb-type and SH-type waves in plate-like structures that closely match the characteristics of the waves described by these strict definitions, including plates with a small degree of curvature and anisotropic plates.

In embodiments in which the dry-coupling scanner technology is implemented as part of an MRUT system, the system operates by scanning the receiver probe across at least one strip of ferromagnetic material that dry-coupled to a structure using mechanical pressure coupling. The system generates guided waves via the magnetostrictive effect, by which a time-varying strain is induced in the magnetostrictive material by means of generating a time-varying current in the probe coil in the presence of a biasing magnetization, said biasing magnetization being perpendicular to the direction of wave propagation. The coil traces are oriented in a manner such that they induce a time-varying magnetic field in the ferromagnetic material that is parallel to the wave propagation direction. By this process, shear horizontal-type guided waves are generated in the structure to which the ferromagnetic material is coupled. The shear horizontal-type guided wave modes propagate through the structure away from the probe, and reflected wave energy from any structural anomalies is subsequently detected by the scanner via the inverse magnetostrictive effect. As the probe is moved to any number of predetermined positions around the circumference of the pipe, the probe motion temporarily ceases, the ferromagnetic strip is temporarily pressure coupled to the pipe, and at least one guided wave signal is collected before said at least one strip is decoupled from the pipe and the motion of the scanner receiver probe resumes to the next predetermined position. This process is repeated and thus a series of guided wave signals are collected along different sections of the structure and combined into a two-dimensional image in the software by reassembling the individual scans in accordance with the position data associated with each individual scan provided by the encoder device.

Velocity-based calculations are then used to determine the distance of the reflector from the probe. In some embodiments, this process is automatically repeated at a sufficiently high rate as the probe is manually or automatically scanned along the structure to generate a two-dimensional inspection image of a region of the structure, in which the axial and lateral locations and extents of anomalies may be identified.

Figure 7:
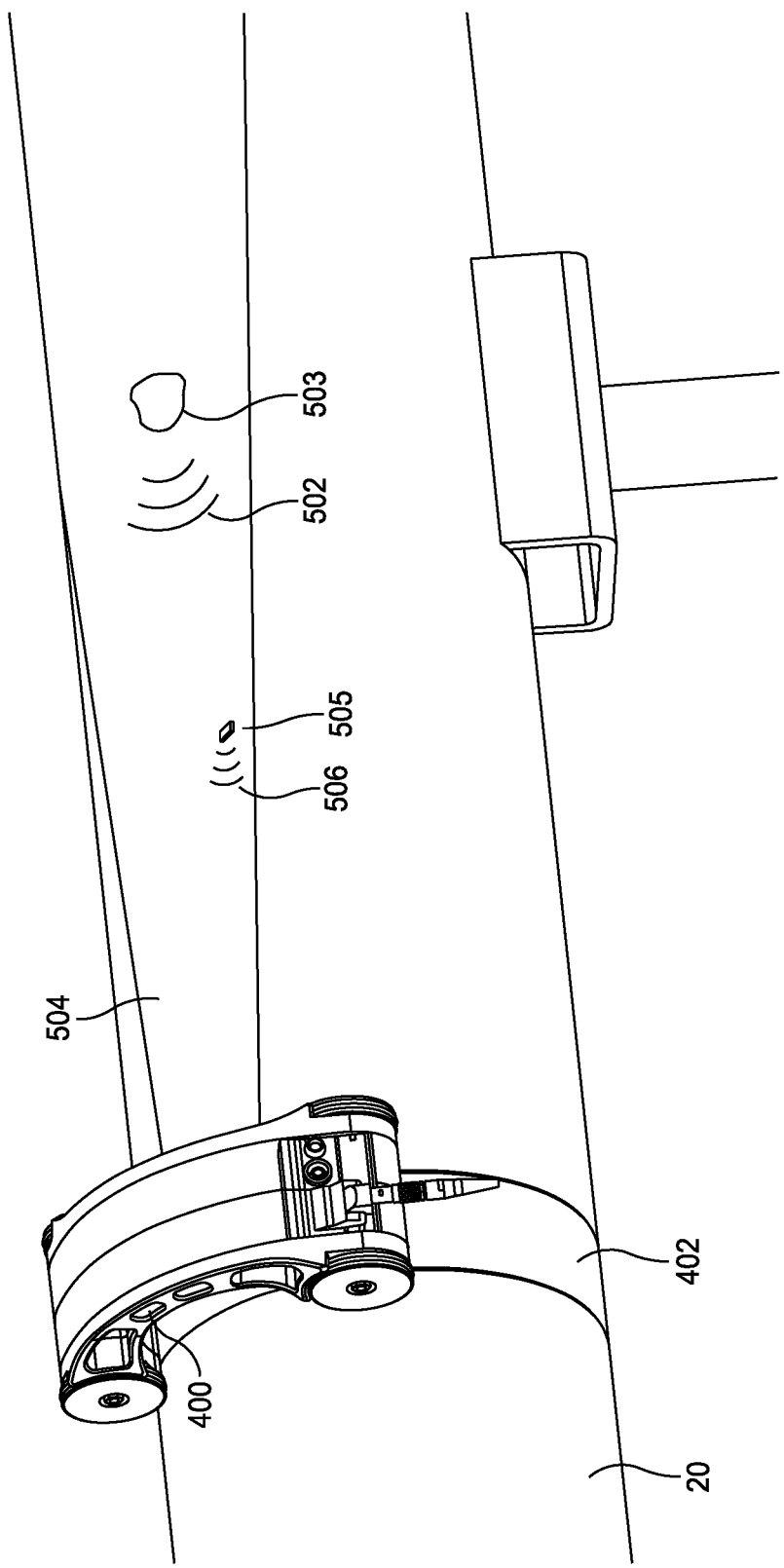
FIG. 7 is a schematic illustration of coupling events propagating around a circumference of a structure, such as a pipe, in accordance with some embodiments.

As illustrated in FIG. 7, during each coupling event at one of the predetermined test locations around the circumference of the pipe, the shear horizontal-type guided wave energy 504 propagates through the structure 20 away from the probe 400 and reflected wave energy 502 from any structural anomalies 503 is subsequently detected by the coil(s) 401 of probe 400 via the inverse magnetostrictive effect. The group velocity of the guided waves is then used to determine the distance of the reflector from the probe 400 based on the arrival time of the reflections and the position data from the encoder 801 is used to determine the lateral (which in some implementations may be circumferential) position of the reflector. This process is automatically repeated as the probe 400 is manually or automatically scanned along the structure and periodically caused to stop, couple to the pipe, collect guided wave data, decouple from the pipe, and proceed to the next stop in order to generate a two-dimensional inspection image of a region of the structure 20, from which the axial and lateral locations and extents of anomalies may be identified.

In some embodiments, a reference target 505 is coupled to the structure 20 adjacent to the scanner 400 and ferromagnetic strip 402 at a known distance to provide a calibration reference reflection 506 for sizing and system-diagnostics. The reference target may include, but is not limited to, a small metallic block or cylinder that is coupled to the structure 20.

Figure 8:
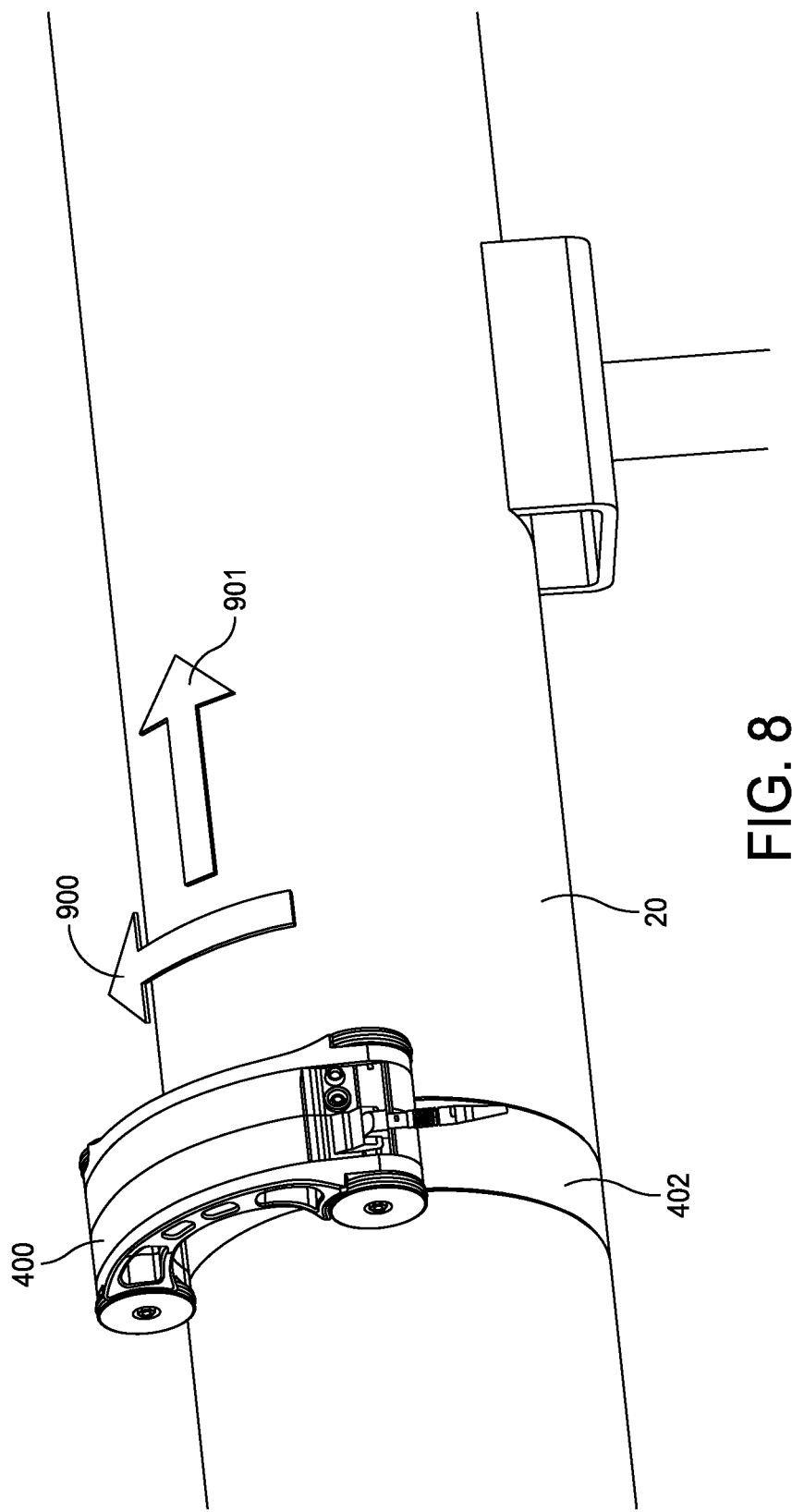
FIG. 8 is a schematic illustration of a probe being moved along a ferromagnetic strip and scanning a structure in accordance with some embodiments.

FIG. 8 illustrates the scanning of a structure 20 using probe 400, in which the probe 400 is moved along the ferromagnetic strip 402 in direction 900 parallel to the biasing magnetization direction of said strip and the guided waves are emitted and received in a direction 901 that is generally perpendicular to direction 900.

FIG. 9 provides a block diagram of such a system in accordance with some embodiments. As shown in FIG. 9, the system may include a processor 1101 in signal communication with the encoder 801, a signal generator/receiver 1100, a memory 1102, and a user interface 1103. User interface 1103 can be implemented using multiple components, including a display, a keyboard, and a mouse. In some embodiments, user interface 1103 is implemented as touch screen display. A person of ordinary skill in the art will understand that a variety of other user interfaces 1103 can be used.

In some embodiments, memory 1102 includes at least one of a read only memory (ROM), random access memory (RAM), a Flash memory, or other non-transitory machine-readable storage medium. Memory 1102 is configured to store software that when executed by processor 1101 controls signal generator/receiver 1100 and performs signal processing techniques to generate and subsequently enhance at least one two-dimensional inspection image. The signal processing techniques utilized in the software may include, but are not limited to, at least one of averaging, filtering, directional wave control, and multi-frequency data acquisition. Other signal processing techniques include synthetic aperture focusing (SAFT), such as disclosed in Sicard et al., "A SAFT algorithm for lamb wave imaging of isotropic plate-like structure" and in Sicard et al., "Guided Lamb Waves and L-SAFT Processing Techniques for Enhanced Detection and Imaging of Corrosion Defects in Plates with Small Depth-to-Wavelength Ratio," both of which are incorporated by reference herein in their entireties, and time-compensated gain (TCG), such as disclosed in U.S. Pat. No. 4,356,731 to Mahoney, which also is incorporated by reference herein in its entirety.

In some embodiments, the signal generator/receiver 1100 includes at least an ultrasonic tone-burst pulser 1110, an analog-to-digital converter 1120, and a pre-amplifier 1130. The processor 1101 and signal generator/receiver 1100 are configured to cause a pulse to be generated by the at least one magnetostrictive coil 600, process the reflected signals detected by the at least one magnetostrictive coil 600, process scanner position data provided by the encoder device 801, and record the waveform and encoder information in the machine readable storage medium 1102.

Figure 10:
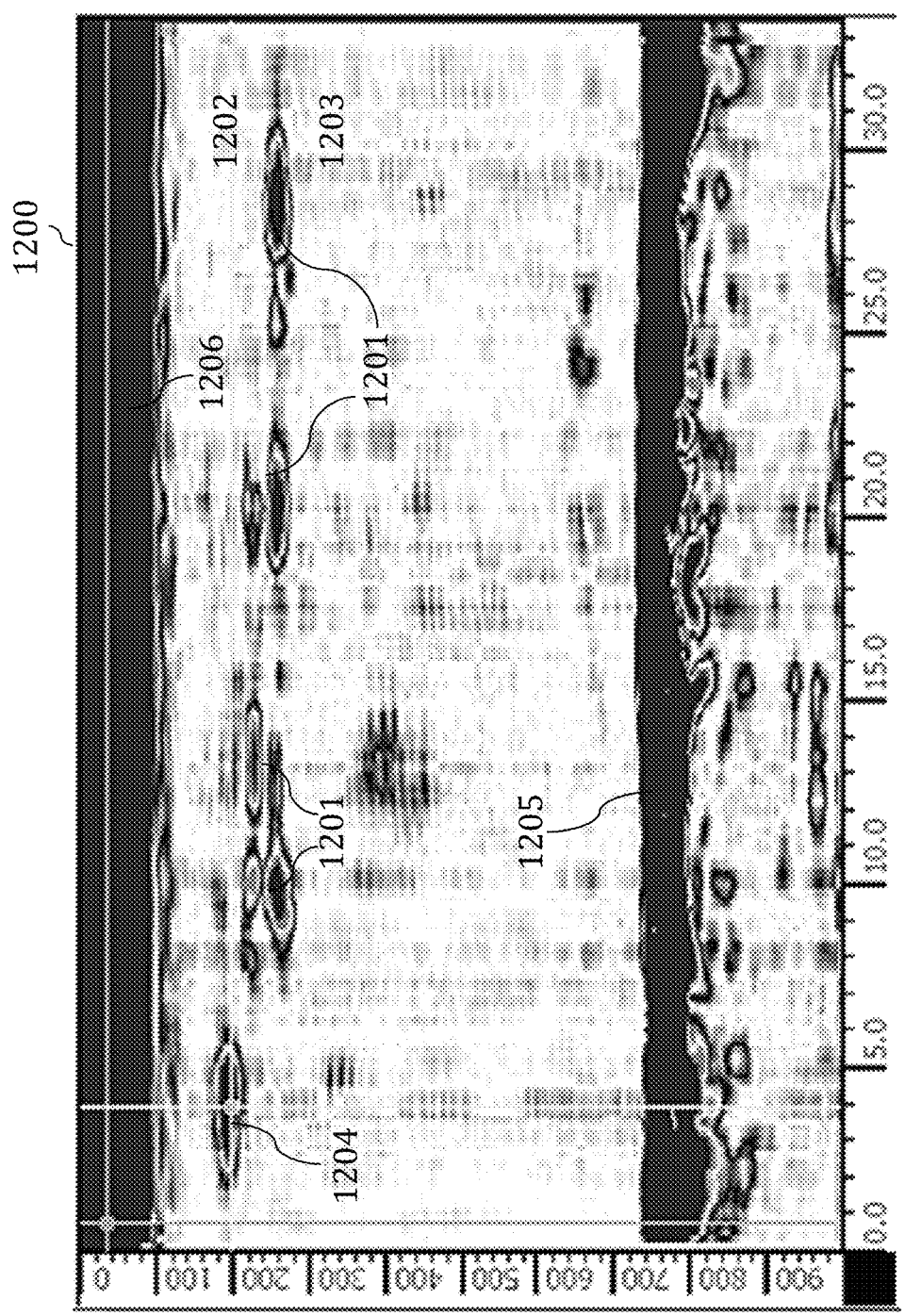
FIG. 10 is one example of a two-dimensional scan image of pitting corrosion identified by a magnetostrictive scanner in accordance with some embodiments.

FIG. 10 shows a two-dimensional scan image 1200 of pitting corrosion 1201 around a spider-style pipe support on a 10" fuel pipeline. The regions of pitting on the near side 1202 and far side 1203 of the support are identifiable, as is a reference target 1204 and the cut end 1205 of the pipe section. In this case, the dead zone 1206 is approximately 6", but much shorter dead zones can be realized by the disclosed systems and methods.

Figure 11:
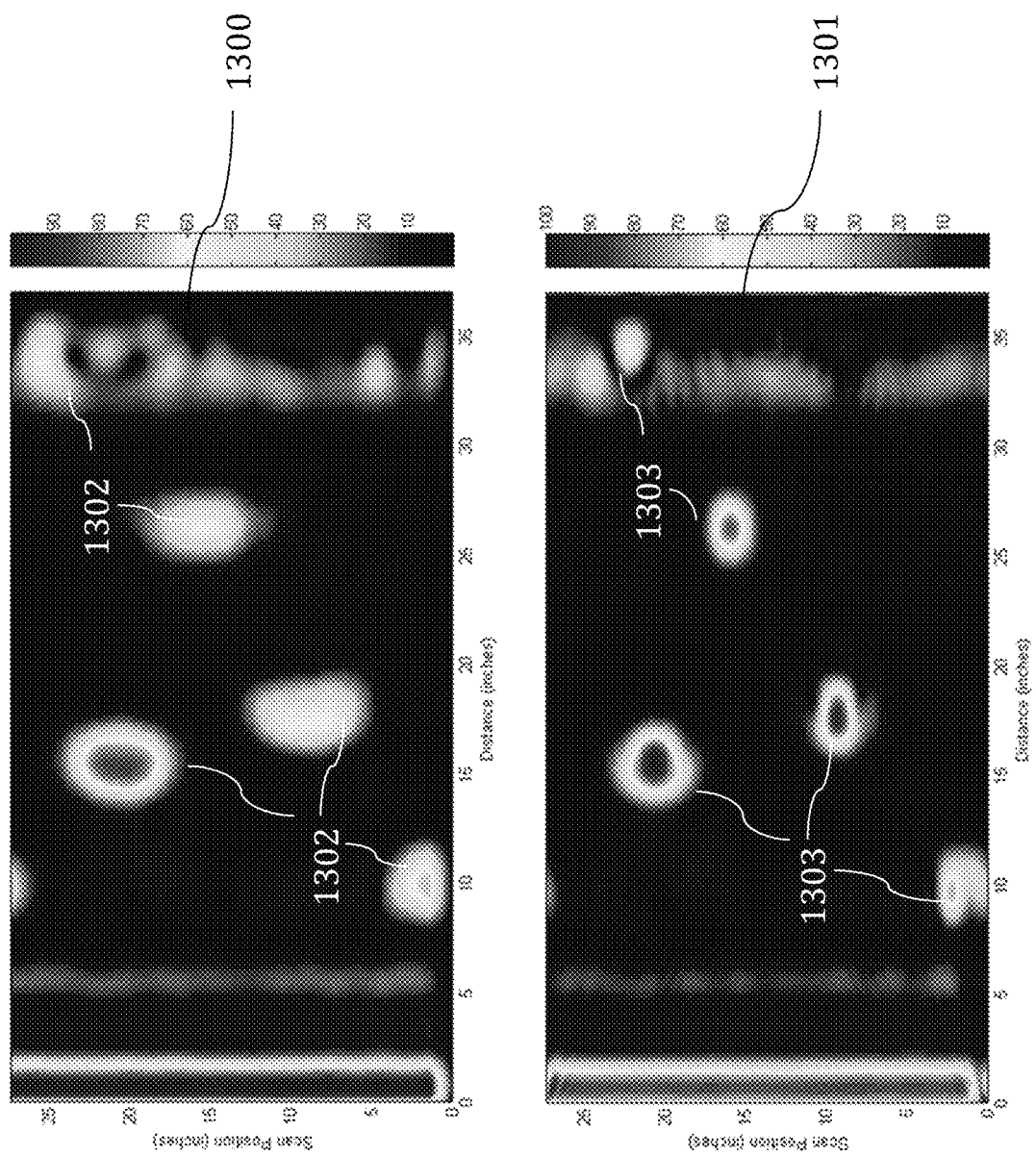
FIG. 11 is one example of a two-dimensional scan showing the effect of a synthetic aperture focusing technique ("SAFT") in accordance with some embodiments.

One example of the effect of a synthetic aperture focusing technique ("SAFT") algorithm is provided in FIG. 11. In embodiments in which a SAFT algorithm is utilized, a time- or frequency-domain algorithm is employed to correlate the reflections detected from various probe locations to reduce the effective beam width of the probe and improve angular resolution. In this case, the image 1301 with SAFT shows circumferentially narrower defect indications 1303 than the same defect reflections 1302 in the image 1300 without SAFT processing.

In embodiments of the dry-coupling scanner technology in which it is implemented as part of an MRUT system, as described in this section, the scanner receiver probe periodically and temporarily stops at any number of predetermined locations around the circumference of the pipe during its scanning motion. During each stop, the at least one ferromagnetic strip is coupled to the pipe using mechanical pressure coupling. The specific mechanisms utilized to move the probe around the circumference of the pipe and to facilitate said mechanical pressure coupling are detailed in the last section, "Dry-Coupling".

LRUT Embodiments

In some embodiments, the disclosed dry-coupled scanner technology is implemented as part of an LRUT scanning system, such as those disclosed in U.S. Pat. No. 9,915,632, the entirety of which is incorporated herein by reference.

FIGS. 12A and 12B illustrate one embodiment of axisymmetric and flexural guided waves that are generated and detected by a magnetostrictive LRUT guided wave pipeline inspection system. FIG. 12A illustrates an axisymmetric guided wave 22 in a pipe 20. Axisymmetric wave 22 is generated by an axisymmetric pulser collar and propagates along the axis of the pipe with generally uniform energy distribution around the circumference. In FIGS. 12a and 2b, the axisymmetric wave is propagating from right to left toward corrosion defect 21 localized on the top of pipe 20. The magnetostrictive guided wave pipeline inspection system emits axisymmetric waves in order to have equal sensitivity to reflectors on all sides of the pipe. FIG. 12b shows that some fraction of the guided wave energy from axisymmetric wave 22 is reflected from defect 21 in the form of a generally non-axisymmetric (i.e., flexural) guided wave 23. The circumferential distribution of flexural guided wave 23 does not immediately reveal the circumferential location of defect 21, particularly if the defect is a distance from the guided wave sensor that is equal to or greater than several diameters of the pipe; this is due to the fact that these flexural waves spiral around the pipe 20 as they propagate away from a non-axisymmetric reflector such as defect 21. In some embodiments, dry-coupling scanner is implemented as part of a magnetostrictive LRUT guided wave pipeline inspection system that utilizes advanced post-processing algorithms to determine the location and size of defects in the pipe based on knowledge of the guided wave mechanics in the pipe and the circumferential distribution of the reflected wave field. Although the axisymmetric wave 22 may not be perfectly axisymmetric and thus contain some small percentage of its energy in flexural wave modes, it will be referred to as "axisymmetric" herein for simplicity. Likewise, flexural wave reflections 23 may contain a large percentage of axisymmetric wave mode energy if they are reflected from generally axisymmetric reflectors such as welds or flanges, or they may only contain a small amount of axisymmetric wave mode energy if reflected from generally non-axisymmetric reflectors such as corrosion, erosion cracks, tees, branches, pipe supports, or other pipe features. These reflections, for simplicity, will be generally referred to as "flexural" herein.

Figure 13:
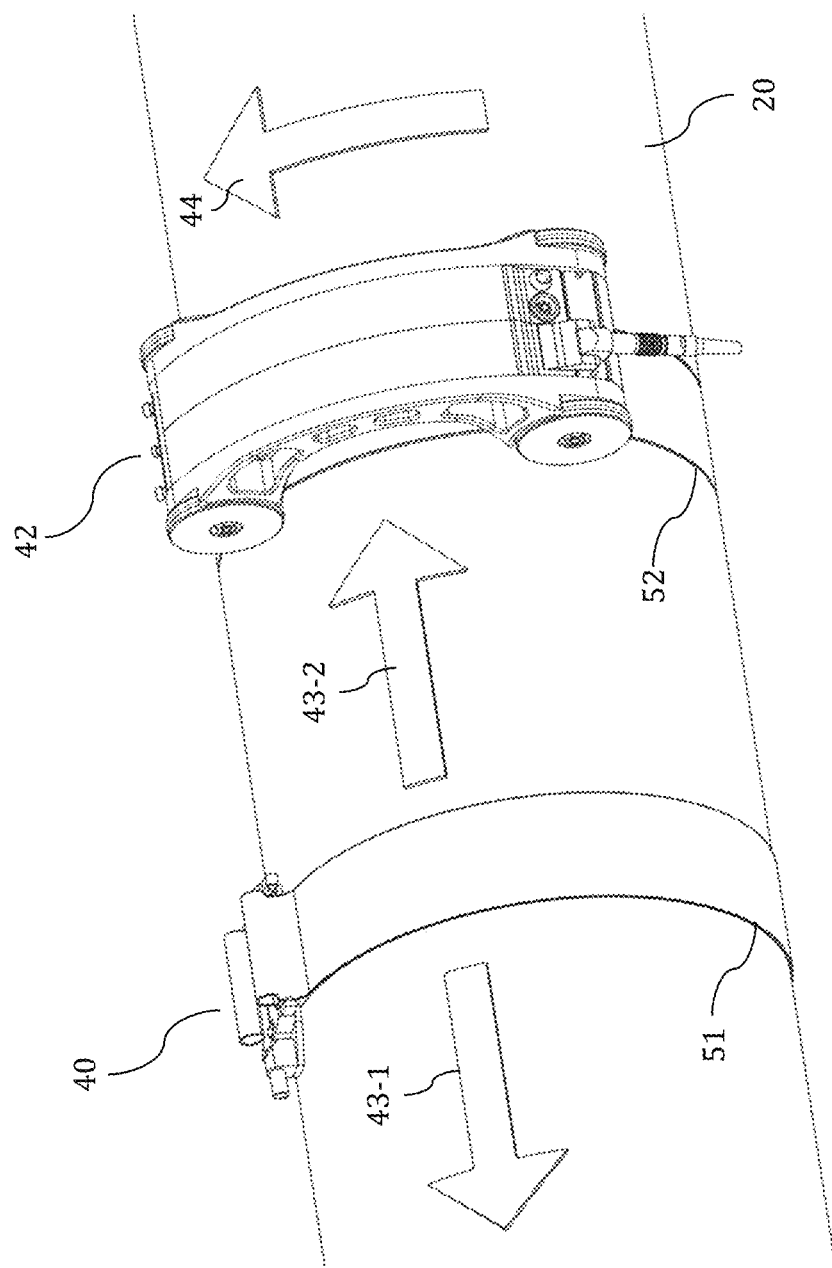
FIG. 13 illustrates one example of a magnetostrictive LRUT guided-wave inspection system in accordance with some embodiments.

FIG. 13 illustrates one example of a magnetostrictive LRUT guided wave pipeline inspection system in accordance with some embodiments. The magnetostrictive guided wave pipeline inspection system illustrated in FIG. 13 utilizes an axisymmetric pulser collar 40 to emit axisymmetric guided waves along the axis of pipe 20 in the forward 43-1, and subsequently, reverse 43-2 directions ("axial direction" 43) and a scanner receiver 42, which is moved in direction 44 around the circumference of pipe 20 to characterize the reflected wave field energy 23. Sender collar 40 is placed adjacent to at least one ferromagnetic strip 51, and receiver 42 is placed adjacent to at least one ferromagnetic strip 52.

Figure 14A:
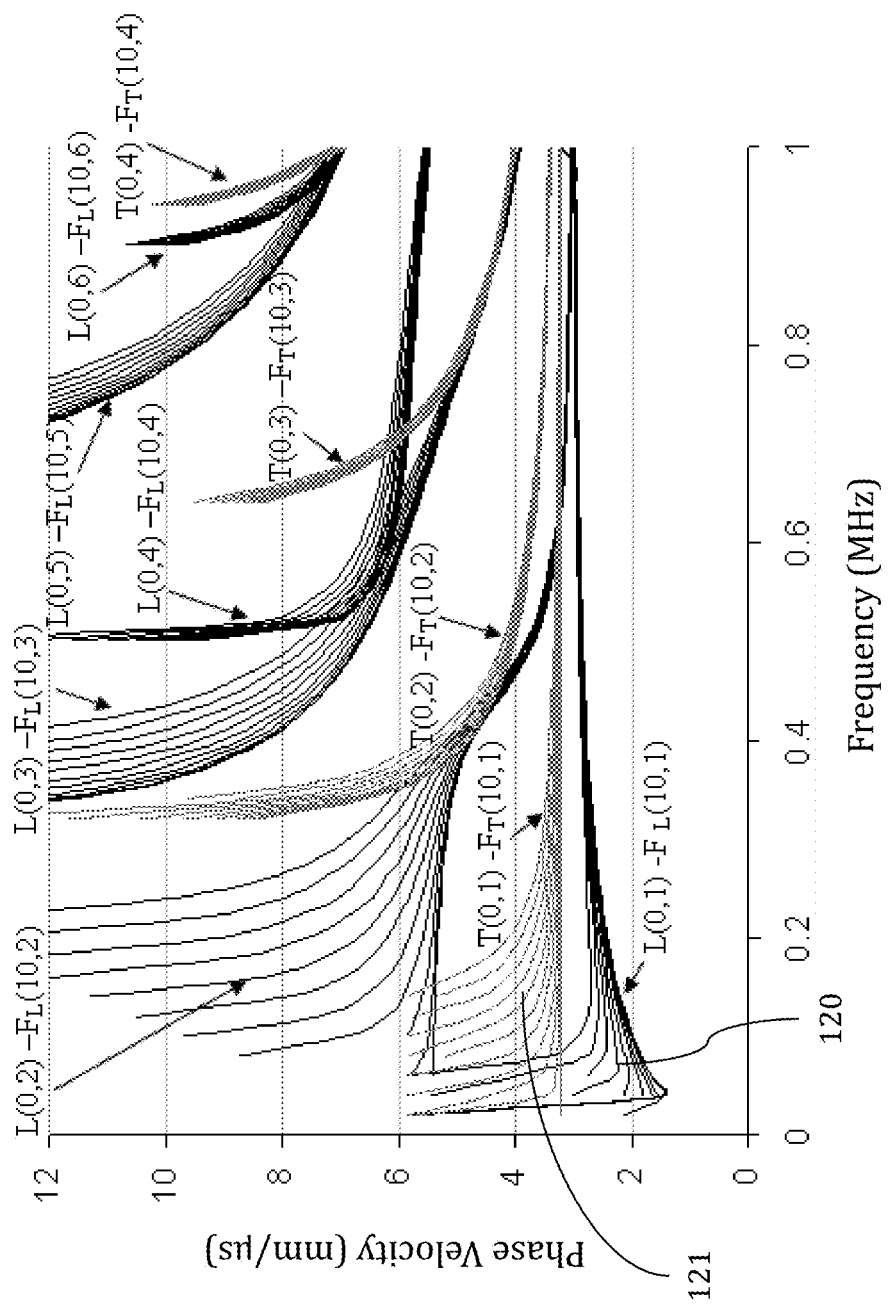
FIG. 14A illustrates examples of dispersion curves of guided wave modes in a structure, such as a pipe, in accordance with some embodiments.

FIG. 14A illustrates dispersion curves 120, 121 of guided wave modes in a pipe. Dispersion curves provide information on the number of guided wave modes that exist in a structure across a range of frequencies and also provide information on the velocity of said modes as a function of frequency. The dispersion curves are developed as a solution to guided wave mechanics equations and are dependent on the material of the waveguide structure and the cross-sectional geometry and dimensions of said structure. In the case of axial guided wave pipe dispersion curves, the wave modes are of one of either the torsional (T) type 121 or the longitudinal (L) type 120. Torsional waves 121 feature predominantly in-plane displacement perpendicular to the axial propagation direction, while longitudinal waves 120 feature predominantly out-of-plane displacement and in-plane displacement parallel to the axial propagation direction. The modes are grouped into mode "families" of modes of either the T or L type that have similar displacement and energy profiles through the thickness of the pipe wall. In some embodiments, the lowest-order L(n,1) longitudinal mode family 120 and the lowest-order T(n,1) torsional mode family 121 are selected. Each mode family is comprised of a fundamental axisymmetric mode T(0,m) or L(0,m), respectively, as well as a set of flexural non-axisymmetric modes T(n≠0,m) or L(n≠0,m), respectively. In some embodiments, the magnetostrictive guided wave pipeline inspection system generates and detects modes in the T(n, 1) family, the L(n,2) family, and/or any other suitable family or combination of families.

Figure 14B:
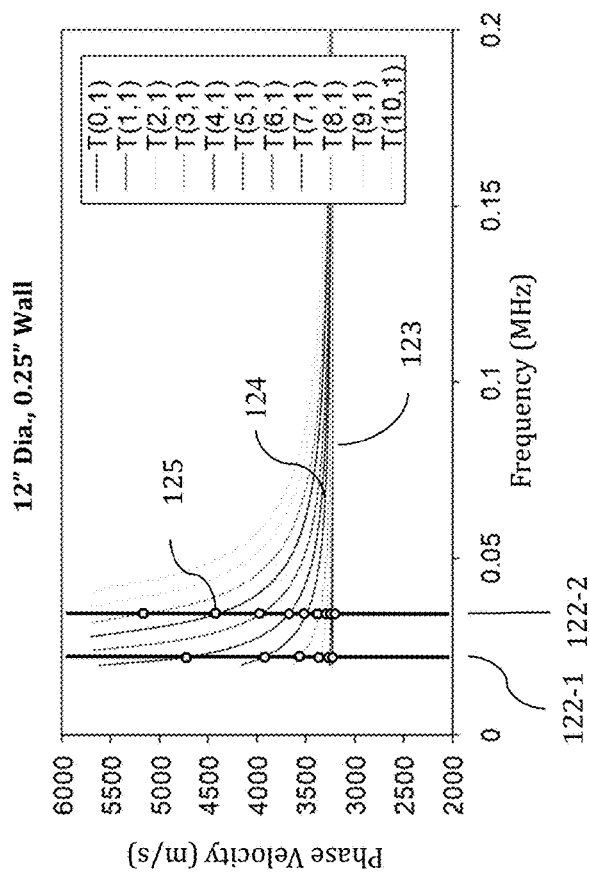
FIGS. 14B and 14C illustrate additional details of the dispersion curves shown in FIG. 14A in accordance with some embodiments.
Figure 14C:
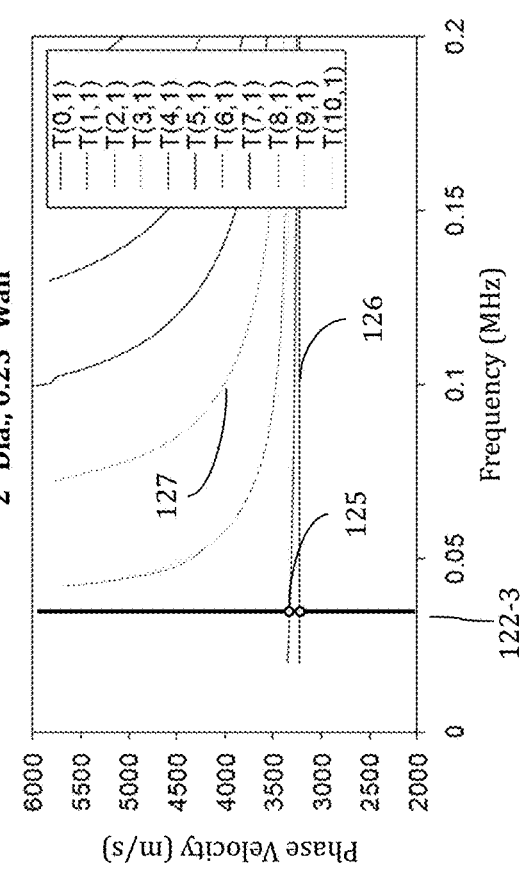

FIGS. 14B and 14C provide further details of the T(n, 1) family dispersion curves for two different pipe sizes. FIG. 14B illustrates the T(n, 1) dispersion curves for a 12"-diameter steel pipe with a 0.25"-thick pipe wall. Vertical lines 122-1 and 122-2 illustrate lines of constant frequency at approximately 25 kHz and 40 kHz, respectively. Points 125 illustrate the intersection of constant-frequency lines 122-1 and 122-2 with the axisymmetric T(0, 1) mode dispersion curve line 123 and the flexural T(n, 1) mode dispersion curve lines 124. The lower-frequency (25 kHz) line 122-1 intersects six dispersion curve mode lines; while the higher-frequency (50 kHz) line 122-2 intersects nine lines, as more modes exist at high frequencies in a given pipe.

FIG. 14C illustrates the T(n, 1) dispersion curves for a 2"-diameter steel pipe with a 0.25"-thick pipe wall. Vertical constant-frequency line 122-3 exists at approximately 40 kHz just like line 122-2 in FIG. 12B. Points 125 illustrate the intersection of constant-frequency line 122-3 with the axisymmetric T(0,1) mode dispersion curve line 126 and the flexural T(n, 1) mode dispersion curve lines 127. The line 122-3 only intersects two modes as compared to line 122-2 at the same frequency in FIG. 14C, which intersects nine modes, as fewer modes exist in smaller-diameter pipes than in larger diameter pipes at a given frequency.

In some embodiments, the number of guided wave modes that exist in a pipe of a particular frequency is predetermined to achieve optimum synthetic focusing resolution and inspection speed of the synthetic focusing algorithm as detailed below.

In some embodiments, the two-dimensional synthetic focusing image, i.e., the "unrolled pipe image" or "C-scan image", is generated via a modal decomposition and back-propagation algorithm, such as, for example, the modal decomposition and back-propagation algorithm discussed above. Directly correlating the circumferential location of the receiver that yielded maximum reflection amplitude from a particular feature in the pipe with the true circumferential location and extent of said feature is highly inaccurate because it does not account for the complex wave propagation of the guided wave energy reflected from said feature, as is illustrated by the misalignment of flexural reflection 23 and corrosion defect 21 in FIGS. 12A and 12B. In contrast, the back-propagation algorithm utilized by the magnetostrictive guided wave pipeline inspection system accounts for these complexities and yields highly accurate synthetic focusing results. The ability of the synthetic focusing algorithm to determine the circumferential location and extent of a reflector is limited by the number of partial loading segments with which the guided wave signals were collected. For simplicity, consider a system in which N non-overlapping partial loading segments are used to collect guided wave echoes from one or more features in a pipe. In such a case, the circumferential resolution of the synthetic focusing scheme is limited to the aperture of the individual partial loading segments. For example, in some embodiments, a typical 8-channel segmented pipe inspection collar can only resolve circumferential reflectors to $\frac{1}{8}^{th}$ of the pipe circumference, at best, regardless of the diameter of the pipe. For larger pipe diameters, this is very limiting because it provides poor circumferential resolution, which is critical for data interpretation and characterization and sizing of defects. For example, on a 24" diameter pipe, the lateral resolution of a typical 8-channel segment pipe inspection collar would be limited to 9.4", and on a 48" diameter pipe, the lateral resolution is limited to 18.8". By providing a moveable receiver coil, the number of circumferential receiver locations in the magnetostrictive guided wave pipeline inspection system is less limited. For larger-diameter pipes, more receiving locations can be used to generate more accurate synthetic focusing scans and provide greatly improved circumferential resolution. For example, in the case of an 8" NPS pipe, the resolution can be improved by approximately a factor of 2.5 at 60 kHz. In larger-diameter pipes and at higher frequencies, the improvements in resolution are even greater. For example, in a 24" NPS pipe at 120 kHz, the resolution can be improved by approximately a factor of 13.5 over conventional LRUT. Furthermore, the number of flexural modes T(m≠0, 1), which are used in the algorithm to determine the circumferential location and extent of reflectors in the pipe, are limited in all cases. At a particular frequency, larger-diameter pipes will have more flexural modes than equivalent smaller-diameter pipes. The use of N partial loading receiver locations allows the synthetic focusing algorithm to decompose the signals into N/2+1 unique guided wave modes including the one axisymmetric mode and N/2 flexural modes. If M flexural modes exist in a particular pipe at a particular frequency and N/2<M, aliasing will occur in the wavenumber domain which can yield inaccuracies and less than optimal focusing resolution.

In some embodiments, the magnetostrictive guided wave pipeline inspection system utilizes user-defined pipe information to determine the necessary number of receiver locations to achieve maximum circumferential resolution based on the number of flexural guided wave modes that exist at the frequency at which the inspection is being performed. FIGS. 13a and 13b illustrate receiver scanning segmentation for a 12"-diameter pipe at approximately 25 kHz and 40 kHz, respectively.

Figure 15A:
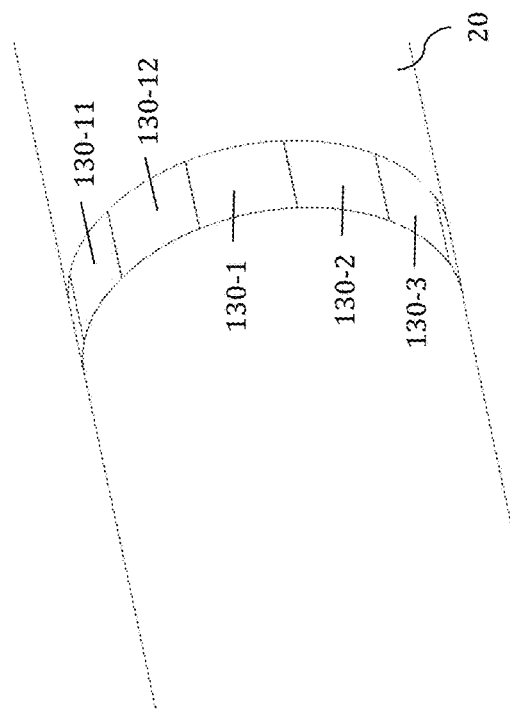
FIGS. 15A and 15B are schematic illustrations of circumferences of pipe being divided into receiver segments in accordance with some embodiments.

Referring to FIG. 15A, a pipe's circumference is evenly divided into N=12 receiver segments 130-1 through 130-12 ("segments" 130), which meets the N/2≥M condition to achieve optimum lateral resolution at a frequency of 25 kHz in said pipe based on the existence of M=6 wave modes T(0,1) through T(5,1) at said frequency in said pipe as illustrated in the dispersion curves in FIG. 14B.

Figure 15B:
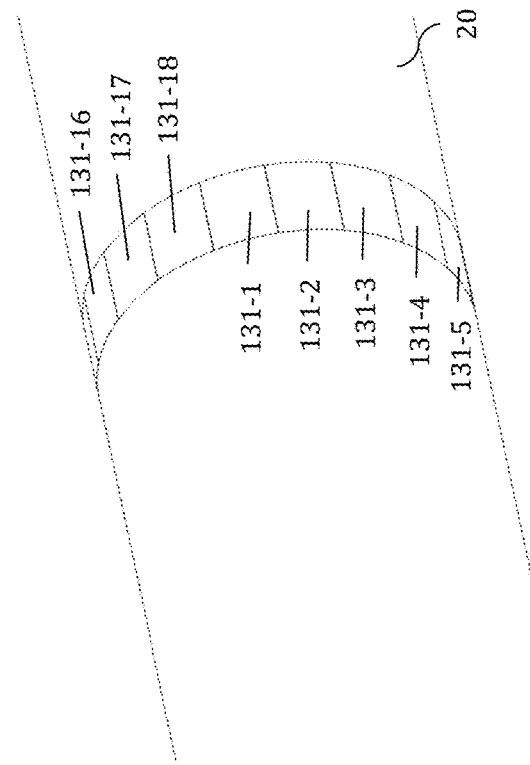

Referring to FIG. 15B, the pipe's circumference is evenly divided into N=18 receiver segments 131-1 through 131-18 ("segments" 131), which meets the N/2≥M condition to achieve optimum lateral resolution at a frequency of 40 kHz in said pipe based on the existence of M=9 wave modes T(0,1) through T(8,1) at said frequency in said pipe as illustrated the dispersion curves in FIG. 14C.

The segments 130 and 131 in FIGS. 15A and 15B represent the locations of data collection by the receiver coil 74 on the pipe. In some embodiments, the aperture 94 is such that receiver coils 74 extend beyond but are generally centered within an individual segment 130. In some embodiments, said segments 130 partially overlap one another, which can be advantageous for improving signal amplitude. In some embodiments, the receiver coil is positioned at each location defined by segments 130 and 131 and the at least one ferromagnetic strip is temporarily dry-coupled to the pipe using mechanical pressure coupling.

Figure 16A:
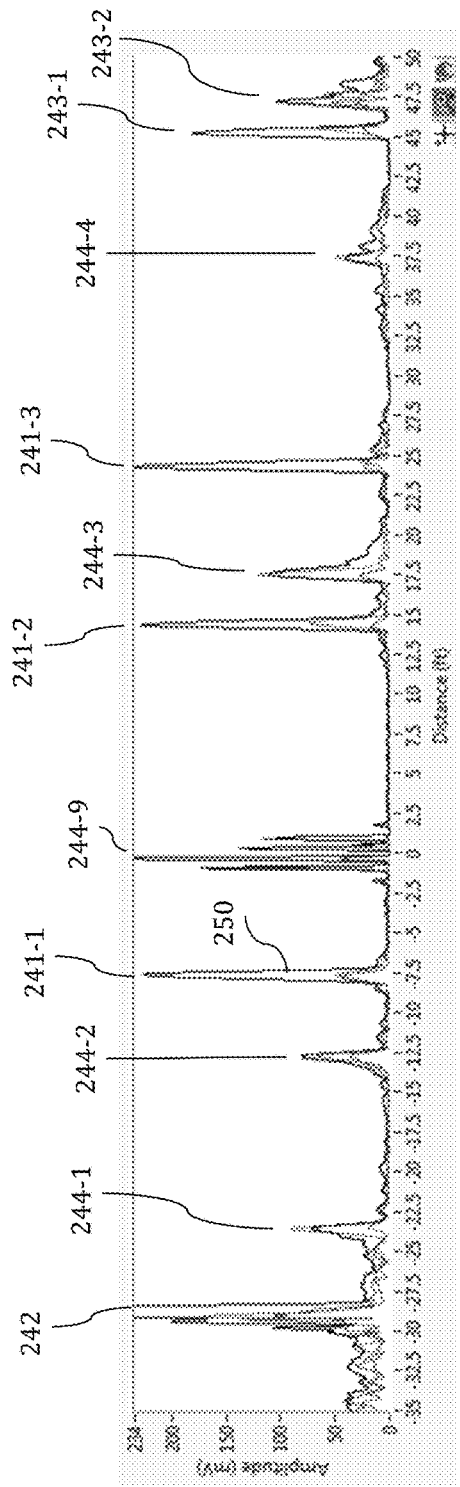
FIG. 16A is an example of a one-dimensional "A-scan" in accordance with some embodiments.
Figure 16B:
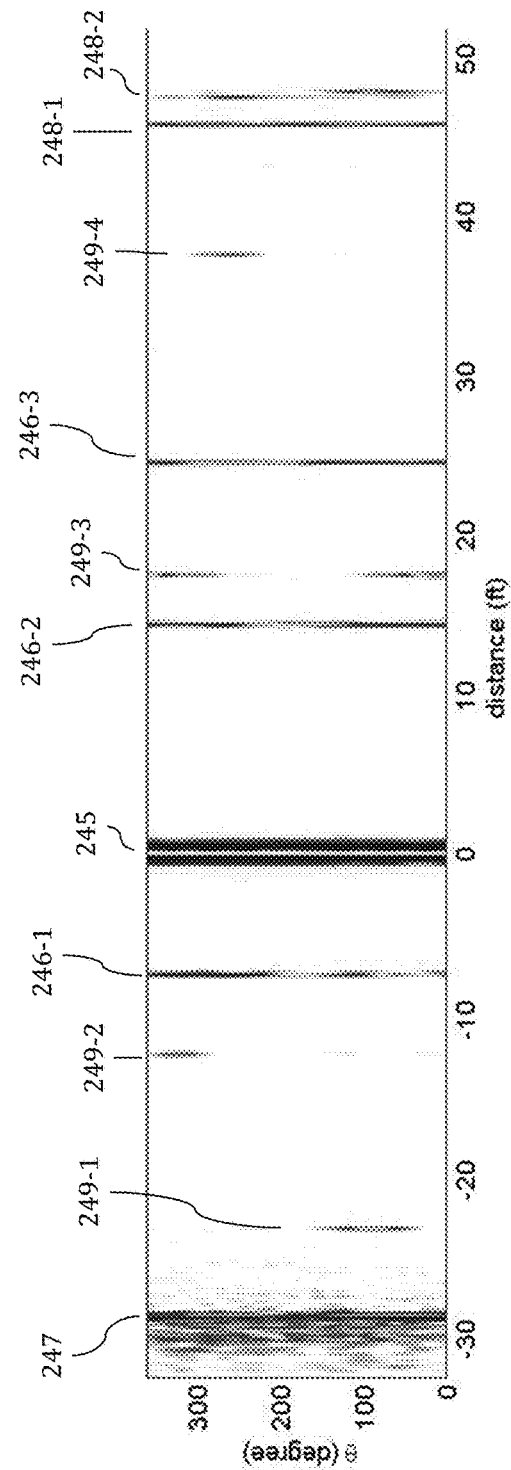
FIG. 16B is an example of a two-dimensional synthetic focusing scan in accordance with some embodiments.

FIGS. 16A and 16B are examples of one embodiment of a one-dimensional "A-scan" and a two-dimensional synthetic focusing scan, respectively, which were generated using a magnetostrictive guided wave pipeline inspection system applied to an 80' length of pipe with simulated corrosion defects and a variety of structural features. The 8"-diameter length of pipe features a flange at the left end and a short-radius welded elbow at the right end. The pulser collar 40 and scanner receiver 42 were coupled to the pipe approximately 28' to the right of the flange and 45' left of the elbow. The location of the pulser 40 and receiver 42 is hereafter referred to as "0 feet", and the convention of negative distances to the left and positive distances to the right relative to this 0 position is hereafter adopted when referring to said pipe. Girth welds were present at approximately −7', +14', and +24'. Simulated corrosion defects (drilled spherical pits) were present at approximately −23', −12', +17', and +37'.

FIG. 16A illustrates an A-scan collected on the pipe loop described above at a center frequency of 64 kHz. The horizontal axis in FIG. 16A denotes axial distance along the pipe and the vertical axis denotes reflected wave amplitude. While multiple lines are present in this A-scan, only the highest-amplitude, black line 250 is pertinent for this description. This line is generated using a method which entails summing the waveforms received by the scanner receiver at all positions, filtering said summed waveform, and enveloping said waveform. The A-scan provides indications of the presence of all anomalies in the pipe. Weld reflections 241-1, 241-2,241-3, flange reflection 242, elbow weld reflections 243-1,243-2, and defect reflections 244-1, 244-2, 244-3,244-4. Indication 240 at the 0 location is referred to as the "dead zone" of the inspection and is due to saturation of the receiver electronics due to the emitted axisymmetric wave pulse. However, the limited information in the A-scan of FIG. 16A makes it very challenging to differentiate the non-critical structural features from the critical corrosion defects. Furthermore, it is impossible to determine the lateral extent of said reflectors, which would provide information that is critically important for distinguishing non-critical structural features from critical defects as well as characterizing the dimensions of said defects.

FIG. 16B illustrates a synthetic focusing scan, i.e. "unrolled pipe image" or "C-scan" image, generated from multiple A-scans, such as the one in FIG. 16A. The horizontal axis in FIG. 16A denotes axial distance along the pipe and the vertical axis denotes circumferential position around the pipe and is thus configured such that 0° at the lower extreme of said image and 360° at the upper extreme of said image are equivalent. The intensity (darkness) of the synthetic focusing image is representative of the amplitude of the reflections. As described above, the synthetic focusing image is generated by means of a modal decomposition and back-propagation algorithm. The indications due to the dead zone and any generally axisymmetric reflectors, including welds 246-1, 246-2, 246-3, flange 247, and the first elbow weld 248-1, have generally uniform amplitude vertically, i.e. around the circumference of the pipe. Analogously, the non-axisymmetric reflections, including corrosion indications 249-1, 249-2, 249-3, 249-4 and the second elbow weld 248-2, are representative of non-axisymmetric reflectors. Based on the additional information provided by the focused image, the defects are now clearly distinguishable from the non-critical structural features and the circumferential location and extent of said defects can be characterized.

The second weld reflection 248-2 in FIG. 16B is non-axisymmetric because the waves travel a shorter path along the intrados of said elbow than the waves propagating along the longer extrados of said elbow. The reflections from the second weld at the intrados and extrados are clearly distinguishable in the synthetic focusing image.

FIGS. 17A and 17B provide a comparison between a synthetic focusing scan generated by a conventional 8-segment LRUT system and a synthetic focusing scan generated by the magnetostrictive guided wave pipeline inspection system using a 32-segment receiver scan, respectively. Both scans were collected at a 64-kHz center-frequency from the same location of the pipe loop described in reference to FIGS. 16A and 16B. The synthetic focusing scan has a higher resolution of the corrosion defects 154-1, 154-2, 154-3, 154-4 and the corrosion defects 159-1, 159-2, 159-3, 159-4 than the conventional 8-segment LRUT scan. For example, in the case of an 8" NPS pipe, the resolution can be improved by approximately a factor of 2.5 at 60 kHz. In larger-diameter pipes and at higher frequencies, the improvements in resolution are even greater. For example, in a 24" NPS pipe at 120 kHz, the resolution can be improved by approximately a factor of 13.5 over conventional LRUT. Since the improved scan in FIG. 17B better focuses the defect reflections, the amplitude of those reflections is also subsequently larger relative to the noise floor than in the conventional scan. The improved scan also features better resolution of the second elbow weld 158-2 and a reduction in the spurious indications observed in the vicinity of defect indication 154-4 in the conventional scan.

FIG. 18 provides a more explicit comparison of one of the synthetic focusing results for the corrosion defect at −23'.

Here the horizontal axis denotes circumferential position around the pipe and the vertical axis denotes amplitude of the synthetic focusing image. The gray line 160 denotes the normalized cross-section of the synthetic focusing scan in FIG. 17A at the −23' location, which provides a cross-sectional representation of defect indication 154-1 generated using a conventional LRUT system. Likewise, the black line 161 denotes the normalized cross-section of the synthetic focusing scan in FIG. 17B at the same location, and thus provides a cross-sectional representation of defect indication 159-1 generated using the magnetostrictive guided wave pipeline inspection system. The width 162 of peak 160 is much wider than the width 163 of peak 161; the true lateral extent 164 of said corrosion defect is from approximately 65° to 110°, as illustrated by the gray box 165. The conventional LRUT system greatly overestimates the width of the corrosion defect while the magnetostrictive guided wave pipeline inspection system does so to a much lesser extent. The estimated depth of the corrosion is determined by dividing the amplitude of the reflection by the width of the reflection. Therefore, an erroneously wide indication would lead to a reduction in the estimated depth of the corrosion. For example, in the case considered in FIG. 18, the typical 8-channel results predict a defect width of approximately 20°-180° and thus a wall loss of only 18%, while the higher-resolution result from the magnetostrictive guided wave pipeline inspection system described herein predicts a defect width of approximately 50°-130° and thus a wall loss of 37%. The value produced by the guided wave pipeline inspection system is far closer to the true wall loss of 50%. The difference in performance between the typical 8-channel system and the magnetostrictive guided wave pipeline inspection system increases for larger-diameter pipes. A higher-frequency scan with the disclosed magnetostrictive guided wave pipeline inspection system would entail collecting data at more circumferential positions and would continue to increase the lateral resolution of the synthetic focusing, however a higher-frequency scan with a conventional LRUT system would continue to utilize 8 segments and resolution would not improve.

A schematic illustration of one non-limiting embodiment of the magnetostrictive guided wave pipeline inspection system is provided in FIG. 19A. In this embodiment, the processor 174 and dual-channel phased array pulser/receiver 170 are configured to generate a time-varying current in two pulser coils 41-1 and 41-2 ("pulser coils" 41) as part of pulser collar 40 with a real-time time delay applied between said coils 41 by means of two independent ultrasonic pulser channels 171-1 and 171-2 ("ultrasonic pulsers" 171). Said processor 174 and pulser/receiver 170 are further configured to detect time-varying currents in the two receiver coils 74-1 and 74-2 ("receiver coils" 74) as part of scanner receiver 42. The guided wave signals detected by receiver coils 42 are amplified by at least one pre-amplifier 173 and digitized by means of two independent analog-to-digital converters 172-1 and 172-2 ("A/D converters" 172). The multi-channel ultrasonic pulsers 171 facilitate real-time time delays between a plurality of pulser coils 41 for the purpose of directional wave control and mode control. The multi-channel A/D converters 172 facilitate simultaneous sampling of guided wave signals detected by a plurality of receiver coils 74 for the purpose of directional wave control. Furthermore, the encoder 71 provides position information to the processor to correlate the received guided wave signals with the location of the receiver coil around the circumference of the pipe. The waveform and encoder data are recorded by the machine-readable storage medium 176. User information is provided to the processor and inspection data is provided to the user via the user interface 175.

A schematic illustration of another non-limiting embodiment of the magnetostrictive guided wave pipeline inspection system is provided in FIG. 19B. The two independent ultrasonic pulsers 171 are replaced be a single ultrasonic pulser 171-1 and a multiplexer 177-1 and the two independent A/D converters 172 are replaced be a single A/D converter 172-1 and a multiplexer 177-2. In this embodiment, the data acquisition process is repeated on each relevant combination of pulser coils 41 and receiver coils 74, and thereby directional wave control and mode control can be achieved via synthetic time delays applied in post-processing.

Furthermore, additional embodiments of the magnetostrictive guided wave pipeline inspection system may utilize any combination of at least one of multi-channel ultrasonic pulsers 171, a single-channel ultrasonic pulser 171-1 in conjunction with multiplexer 177-1, multi-channel A/D converters 172, and a single-channel A/D converter 172-1 in conjunction with multiplexer 177-2. The implementation of any of said combinations would be apparent to one of ordinary skill in the art and is within the scope of this disclosure.

In some embodiments, system software, by means of a processor, incorporates signal processing techniques to generate and subsequently enhance at least one one-dimensional A-scan image and at least one two-dimensional synthetic focusing image. The signal processing techniques utilized in the software may include, but are not limited to, at least one of averaging, filtering, multi-frequency data acquisition, directional control, reverse wave suppression, modal decomposition, and synthetic focusing, as described herein.

In some embodiments, data is collected at more than one central pulsing frequency to improve defect detection and inspection confidence.

FIG. 20 is one example a process flow chart providing a high-level illustration of an inspection method in accordance with some embodiments. In some embodiments, upon initialization of the scan, the scan parameters 182 are provided by the user, including, but not limited to, information relative to the pulser/receiver settings, the geometry and material of the pipe, the guided wave center-frequencies to be utilized, the amount of signal averaging to be utilized, and the length of pipe to be inspected. Based on said scan parameters, the processor determines the number of relevant guided wave modes and the required number of receiver segments around the circumference of the pipe.

Following the initialization process 180, the data collection process 181 is commenced, in which the pulser collar 40 is configured to emit an axisymmetric pulse 22 having a predetermined center-frequency in the "forward" direction 43-1 in conjunction with pulser/receiver 170 and processor 174, and the scanner receiver 42, which is temporarily pressure-coupled to the pipe at a first location around its circumference, subsequently detects any guided wave reflections and records said reflections in conjunction with pulser/receiver 170, processor 174, and machine-readable storage medium 176. The scanner receiver 42 is then decoupled from the pipe, moved to the next location around the pipe circumference, temporarily pressure-coupled to the pipe, and the pulse-receive process is repeated until all signal averaging has been completed in accordance with the scan parameters 182. Said process is then repeated using a configuration such that the axisymmetric waves having said center-frequency are emitted in the "reverse" direction 43-2.

In some embodiments, after recording the requisite forward and reverse data using said process, the process is repeated for any additional center-frequencies in accordance with the scan parameters 182.

In some embodiments, after recording the requisite forward and reverse data at all requisite frequencies in accordance with scan parameters 182, the circumferential location of the scanner receiver is recorded by means of position encoder 71, processor 174, and machine-readable storage medium 176. Thereafter, scanner receiver probe 42 is moved to the next receiver segment 130 as defined in initialization process 180, based on the method described above in reference to FIGS. 14A, 14B, 15A and 15B, and illustrated in FIG. 15A.

In some embodiments, after recording the requisite forward and reverse data at all requisite frequencies within all requisite segments in accordance with scan parameters 182, the data collection process 181 is complete, and the data processing process 183 commences. As part of the data processing process 183, the at least one A-scan image and the at least one synthetic focusing image are generated by means of processor 174, machine-readable storage medium 176, and the processes described in detail above.

In some embodiments, said images are displayed for the user by means of user interface 175. In some embodiments, at least some portion of data processing process 183 is conducted in parallel to data collection process 181 for the purpose of improving efficiency. In some embodiments, the frequency iteration process loop and segment iteration process loop may be interchanged.

In some embodiments of the dry-coupling scanner technology in which it is implemented as part of an LRUT system, as described in this section, the scanner receiver probe periodically and temporarily stops at any number of predetermined locations around the circumference of the pipe during its scanning motion. During each stop, the at least one ferromagnetic strip is coupled to the pipe using mechanical pressure coupling. The specific mechanisms utilized to move the probe around the circumference of the pipe and to facilitate said mechanical pressure coupling are detailed in the last section, "Dry-Coupling".

Dry Coupling

Regardless of whether the disclosed dry-coupling technology is implemented as part of an MRUT or an LRUT guided wave technology, the movement of scanner receiver is achieved by one of manual or automated means. The automated means of carrying out the scanning action may include, but are not limited to, at least one motorized wheel attached to said scanner receiver, a tractor and cable system as illustrated in FIG. 21, and any similar system utilizing actuators or stepper/servo motors. Additional means of moving the scanner receiver around the pipe will be obvious to those of ordinary skill in the art.

FIG. 21 illustrates one embodiment in which the means of moving scanner receiver 42 is a tractor and cable system. In this embodiment, a motorized tractor unit 192 is connected to scanner receiver 42 by at least one tensioned cable or strap 193-1 and 193-2 ("cables" 193). Tractor unit 192 features wheels 191-1 through 191-4, which are magnetic wheels similar in design to wheels 77 in some embodiments. Cables 193 assist in maintaining wheel contact with pipe 20 and facilitate motion in direction 44 or in the opposite direction and may be composed of metallic or polymer stranded cables or metallic or polymer straps or bands. Tractor unit 192 is in communication with processor 174. The tractor and cable design allows scanner receiver 42 and tractor unit 192 to be compatible with a wide range of pipe diameters and also allows scanner receiver 42 to be disconnected from said tractor and said cables to facilitate manual scanning. In some embodiments, tractor unit 192 is weighted to have similar mass to scanner receiver 42 such that it acts as a counter balance to said receiver and the system always experiences a net rotational moment of zero, which prevents unwanted rotation of the system during scanning.

FIG. 22 illustrates one embodiment of the dry-coupled scanner technology in which the magnetostrictive receiver coil and at least one ferromagnetic strip are parts of flexible sensor package 500 attached to scanner receiver probe 42, which is propelled around pipe 20 by means of motorized tractor unit 192. The at least one ferromagnetic strip in sensor package 500 is temporarily dry-coupled to pipe 20 by means of actuator 260. In some embodiments, actuator 260 is an expandable bladder that can be expanded with a gas or a fluid in order to exert pressure on the surface of sensor package 500 opposite from the at least one ferromagnetic strip, which in turn applies the mechanical pressure required to achieve shear coupling between said at least one strip and the surface of pipe 20.

In some embodiments, actuator 260 is comprised of a mechanical actuator such as a screw-drive mechanism, camming mechanism, pneumatic or hydraulic cylinder, or a similar mechanism. It will be obvious to those or ordinary skill in the art that various means of applying pressure to package 500 can be implemented to perform the function of actuator 260. In the embodiments in accordance with FIG. 22, the cables or straps 193 provide the opposing force to resist the force generated by actuator 260 on the pipe.

FIG. 23A-23C illustrate one embodiment of the composition of sensor package 500, which is similar to that disclosed in U.S. patent application Ser. No. 17/032,413, the entirety of which is incorporated herein by reference. FIG. 23A illustrates an exploded layer view of one embodiment of sensor package 500. As shown in FIG. 23A, magnetostrictive material 605-1, 605-2 is configured such that at least some portion of it is in direct contact with a surface of test object 20. A sensor coil circuit 106 is configured in close proximity to magnetostrictive material 605 and a mid-layer 601 and an outer jacket 602 are configured above said circuit. Furthermore, an inner jacket 603 is configured at least partially between magnetostrictive material 605 and test object 20.

In some embodiments, mid-layer component 601 is composed primarily of an elastomer including, but not limited to, silicone rubber, neoprene, polyurethane, and EPDM or a compressible heat resistant material including, but not limited to fiberglass, aramid, and aerogel-based fiber materials, and wherein the inner jacket component 603 or outer jacket component 602 are primarily composed of a material more rigid than that of the mid-layer component, including, but not limited to, stainless steel.

FIG. 23B illustrates an exploded layer view of another embodiment. As shown in FIG. 23B, an insulating layer 604 is included between magnetostrictive material 605 and sensor coil circuit(s) 106 to reduce the temperatures to which said coil circuit(s) are exposed during operation on a high-temperature or low-temperature test object 20. Said insulating layer may be comprised of high-performance, flexible, insulating materials such as fiberglass and aerogel-fiber-based materials including, but not limited to, those marketed under the trade name Pyrogel XT. The thickness of said insulating layer 604 may be minimized in order to reduce the lift-off separation between sensor coil circuit(s) 106 and the magnetostrictive material 605, which can reduce the SNR of the system. Such configurations can extend the maximum operating temperature of the collar as high as 1000° F. or more.

FIG. 23C illustrates an exploded layer view of yet another embodiment. In the embodiment shown in FIG. 23C, at least one thin layer of aluminum (or other metal) foil 606 is included at least partially between magnetostrictive material 605 and test object 20 for the purpose of improving ultrasonic coupling between said magnetostrictive material 605 and said test object.

FIG. 24 illustrates one embodiment of the dry-coupled scanner technology in which scanner receiver probe 42 and tractor unit 192 are incorporated into a single device 600. In this embodiment, cables/straps 193 may not be necessary, as the retention force that opposes the coupling force applied by actuator 260 on sensor package 500 is supplied by at least one of magnetic wheels and supplementary retention magnets in said combined unit 60. Said supplementary retention magnets may be configured between opposing magnetic wheels 191 and are at least one of permanent magnets and electromagnets. In this embodiment, actuator 260 may be of any of the types described in reference to FIG. 22.

FIG. 25 illustrates one embodiment of the dry-coupled scanner technology in which scanner receiver probe 42 is effectively eliminated and strap 193 is attached directly to actuator 260 and sensor package 500. In this embodiment, actuator 260 may be of any of the types described in reference to FIG. 22.

FIG. 26 illustrates one embodiment of the dry-coupled scanner technology in which scanner receiver probe 42 is effectively eliminated and strap 193 is attached directly to sensor package 500. In this embodiment, mechanical pressure coupling of sensor package 500 to pipe 20 is achieved by tensioning strap 193, which may be comprised of a metallic band or a woven polymer strap. Various means of tensioning strap 193 via mechanisms located in or attached to tractor unit 192 will be obvious to those of ordinary skill in the art and may include, but not be limited to, a camming mechanism, a linear actuator, a motorized screw actuator, and a pneumatic or hydraulic cylinder.

Each of the mechanisms by which temporary dry-coupling of the at least one ferromagnetic strip to the pipe can be achieved by means of applying mechanical pressure to sensor package 500 advantageously provides the ability to shear couple a magnetostrictive receiver segment to said pipe while scanning said receiver around said pipe in an efficient manner, which eliminates the need for gel or liquid couplants, adhesive couplants, or other means of non-dry coupling.

What is claimed is:

1. A system for non-destructive inspection of a structure, comprising:
    at least one scanner body for supporting a position encoder and at least one wheel, the position encoder configured to provide data on the location of the scanner body, wherein the at least one wheel is configured to be disposed on a surface of a structure and move the at least one scanner body relative to the structure;
    a sensor package, including at least one ferromagnetic strip and at least one flexible coil, coupled to the at least one scanner body such that the sensor package, including the at least one ferromagnetic strip and the at least one flexible coil, is configured to move with the at least one scanner body, the at least one ferromagnetic strip arranged in the sensor package such that the at least one ferromagnetic strip is configured to be disposed adjacent to at least one surface of the structure to be inspected;
    at least one biasing magnet for applying a biasing magnetic field to said at least one ferromagnetic strip;
    an actuator mechanism configured to provide a mechanical pressure coupling between said at least one ferromagnetic strip of the sensor package and the structure such that the at least one flexible sensor coil can at least one of (i) transmit an ultrasonic guided wave into the structure and (ii) receive an ultrasonic guided wave from the structure;
    a retention mechanism configured to counteract a force applied by said actuator mechanism; and
    a processor in signal communication with the sensor package, the processor configured to:
        record ultrasonic guided wave signals detected by said at least one flexible sensor coil,
        record scanner body location data provided by said position encoder, and
        generate two-dimensional image data of an anomaly in the structure based on the ultrasonic guided wave signals detected by the at least one flexible sensor coil reflections and location data.

2. The system of claim 1, further comprising an electronic pulser system configured to generate a time-varying current in said at least one flexible sensor coil to induce a time-varying magnetization in said at least one ferromagnetic strip in the presence of the biasing magnetic field to generate an ultrasonic guided wave in the structure.

3. The system of claim 1, wherein the sensor package includes a nonconductive mid-layer disposed adjacent to said sensor coil and an outer jacket layer disposed adjacent to said mid-layer.

4. The system of claim 1, wherein the sensor package includes at least one layer of aluminum foil configured to be disposed between the at least one ferromagnetic strip and the structure.

5. The system of claim 1, wherein the at least one flexible sensor coil comprises at least one of a flat-flexible cable and a flexible printed circuit board.

6. The system of claim 1, wherein said at least one flexible sensor coil is interchangeable to accommodate one or more coil designs that operate in a range of frequencies from 10 kHz to 2 MHz and with a range of apertures between 10 mm and 200 mm.

7. The system of claim 1, wherein said at least one biasing magnet comprises at least one of a permanent magnet and an electromagnet.

8. The system of claim 1, further comprising a motor configured to rotate the at least one wheel in order to move the at least one scanner body across the structure.

9. The system of claim 8, wherein said at least one scanner body comprises a first scanner body and a second scanner body that are connected to each other, the first scanner body supporting said sensor package and the second scanner body supporting said motor.

10. The system of claim 1, wherein said retention mechanism includes at least one retention magnet configured to be disposed adjacent to at least one surface of the structure.

11. The system of claim 1, further comprising at least one cable or strap that is configured to wrap at least partially around the structure and is connected to said at least one scanner body.

12. The system of claim 11, wherein said actuator mechanism is configured to apply tension to said at least one cable or strap in order to apply force to said sensor package.

13. The system of claim 1, wherein said actuator mechanism is configured to be adjacent to said sensor package and comprises at least one of a pneumatic expandable bladder, a pneumatic membrane, a pneumatic linear actuator, a camming mechanism, and a screw-drive mechanism.

14. A method for non-destructive inspection of a structure, comprising:
 disposing a scanning probe at a first scan location adjacent to the structure, the scanning probe comprising:
  at least one scanner body supporting at least one wheel and a position encoder, and
  a sensor package, including at least one sensor coil and a ferromagnetic strip, the sensor package coupled to the at least one scanner body such that the sensor package, including the at least one ferromagnetic strip and the at least one flexible coil, is configured to move with the at least one scanner body;
 applying a biasing magnetization to the ferromagnetic strip;
 applying coupling force, by means of an actuator mechanism, to generate mechanical coupling pressure between said ferromagnetic strip and the structure;
 applying a counteracting force to the at least one scanner body, by means of a retention mechanism, to maintain contact between said at least one scanner body and the structure;
 detecting reflected ultrasonic guided wave energy by means of said at least one sensor coil; and
 disengaging the actuator mechanism to remove the coupling force;
 moving the scanning probe, including the sensor package comprising the at least one ferromagnetic strip and the at least one flexible coil, in a first direction along the surface of the structure to a second scan location; and
 generating, by a processor, two-dimensional image data of an anomaly in the structure based on reflected ultrasonic guided wave energy and positional data received from the encoder.

15. The method of claim 14, further comprising, prior to detecting reflected ultrasonic guided wave energy, generating a time-varying current in said at least one sensor coil to induce a time-varying magnetization in said ferromagnetic strip in the presence of the biasing magnetization to generate ultrasonic guided waves in the structure that propagate in a second direction that is different from the first direction.

16. The method of claim 14, wherein moving the scanning probe includes using a motor.

17. The method of claim 14, wherein the generating includes using ultrasonic guided wave velocity and probe position data.

18. The method of claim 14, wherein generating two-dimensional image data includes using a synthetic aperture focusing technique.

19. The method of claim 14, wherein at least one of an aperture of said sensor coil and a spacing between scan locations is determined based on a diameter, a thickness, and a material of the structure and a number of flexural guided wave modes that exist in the structure within a predetermined range of frequencies.

20. The method of claim 14, wherein the retention mechanism includes at least one retention magnet disposed adjacent to at least one surface of the structure.

* * * * *